(12) United States Patent
O'Dowd

(10) Patent No.: US 7,507,311 B2
(45) Date of Patent: Mar. 24, 2009

(54) PROCESS AND APPARATUS FOR MAKING HEAT-SEALED ARTICLES

(75) Inventor: Robert O'Dowd, Wesley Hills, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 489 days.

(21) Appl. No.: 10/980,754

(22) Filed: Nov. 3, 2004

(65) Prior Publication Data
US 2006/0090839 A1 May 4, 2006

(51) Int. Cl.
*B32B 37/00* (2006.01)
(52) U.S. Cl. ............... 156/308.4; 156/209; 156/244.11; 156/290; 156/309.6
(58) Field of Classification Search ............ 156/209, 156/219, 290, 583.1, 308.4, 244.11, 309.6; 206/522; 229/87.01, 87.02, 87.03; 219/244
See application file for complete search history.

(56) References Cited

U.S. PATENT DOCUMENTS

| | | | |
|---|---|---|---|
| 3,208,898 A * | 9/1965 | Chavannes et al. | 156/498 |
| 3,854,031 A | 12/1974 | Keller | |
| 4,096,306 A | 6/1978 | Larson | |
| 4,105,491 A | 8/1978 | Haase et al. | |
| 4,302,276 A | 11/1981 | Schulze | |
| 4,579,516 A | 4/1986 | Caputo | |
| 4,714,819 A * | 12/1987 | Yamashita | 219/216 |
| 5,094,613 A * | 3/1992 | Dolcimascolo et al. | 432/60 |
| 5,188,691 A * | 2/1993 | Caputo | 156/145 |
| 5,902,753 A | 5/1999 | DeMott et al. | |
| 6,032,712 A | 3/2000 | Biagiotti | |
| 6,033,509 A * | 3/2000 | Miyamoto et al. | 156/164 |
| 6,158,501 A * | 12/2000 | Koivukunnas | 165/89 |
| 6,165,298 A | 12/2000 | Samida et al. | |
| 6,405,779 B1 | 6/2002 | Wittkopf | |
| 6,713,726 B2 * | 3/2004 | Tanaka et al. | 219/244 |
| 6,800,162 B2 | 10/2004 | Kannankeril et al. | |
| 2003/0000934 A1 | 1/2003 | Tanaka et al. | |

FOREIGN PATENT DOCUMENTS

JP 08270641 A 10/1996

* cited by examiner

*Primary Examiner*—Jeff H Aftergut
(74) *Attorney, Agent, or Firm*—Alston & Bird LLP

(57) ABSTRACT

Heat-sealed articles formed from polymer film portions heated-sealed together in selected areas forming a heat seal pattern, by passing the film portions together in a partial wrap about a heated sealing roller having a cylindrical outer surface that supports the film portions in a smooth cylindrical configuration about the roll. The cylindrical outer surface of the roller comprises a first surface portion defining a configuration corresponding to the heat seal pattern and formed of a first material having a first thermal conductivity, and a second surface portion formed of a second material having a second thermal conductivity lower than the first thermal conductivity such that only areas of the film portions in contact with the first surface portion are heat sealed together, the first and second surface portions being substantially flush with each other at the outer surface.

27 Claims, 14 Drawing Sheets

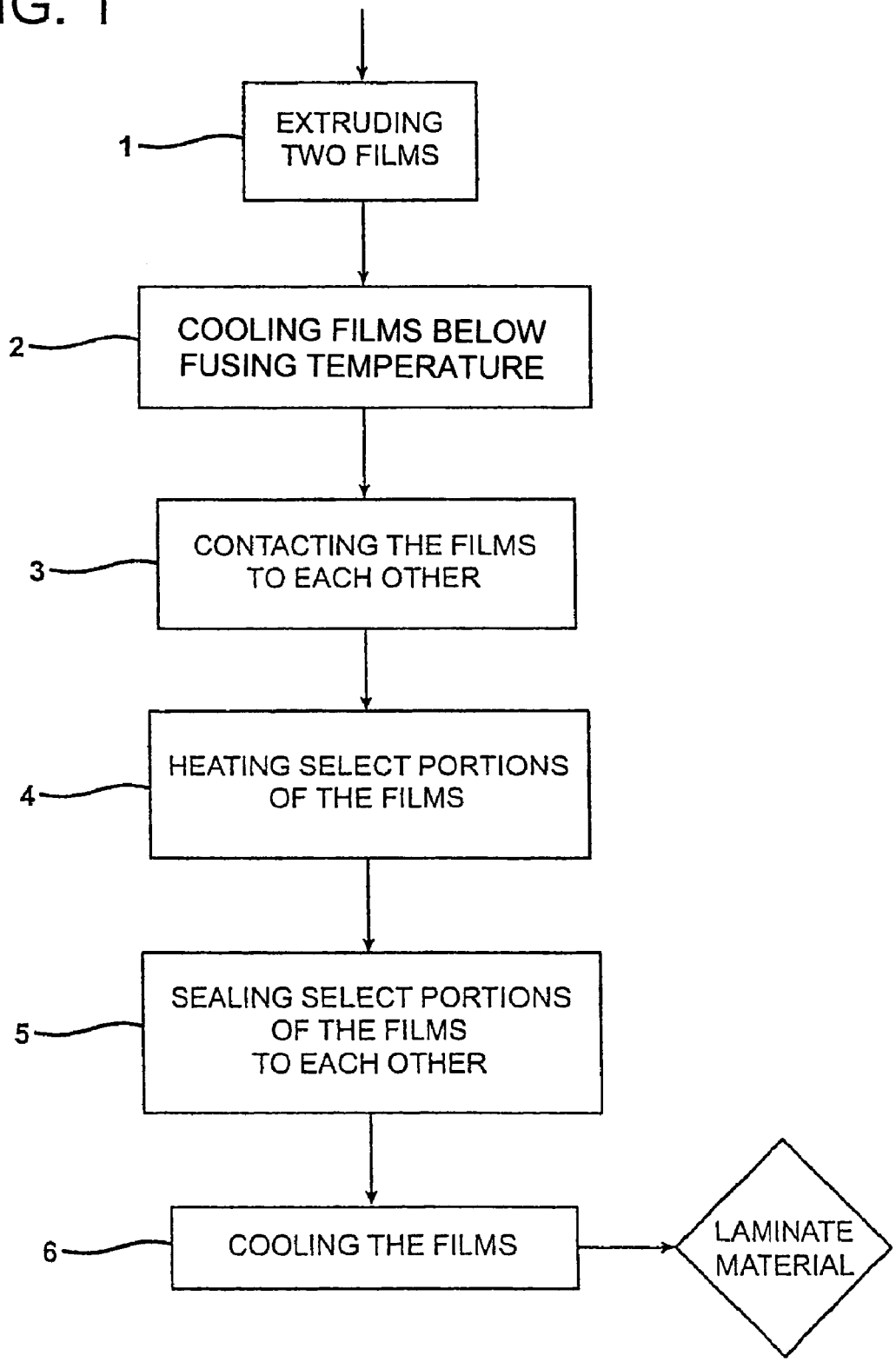

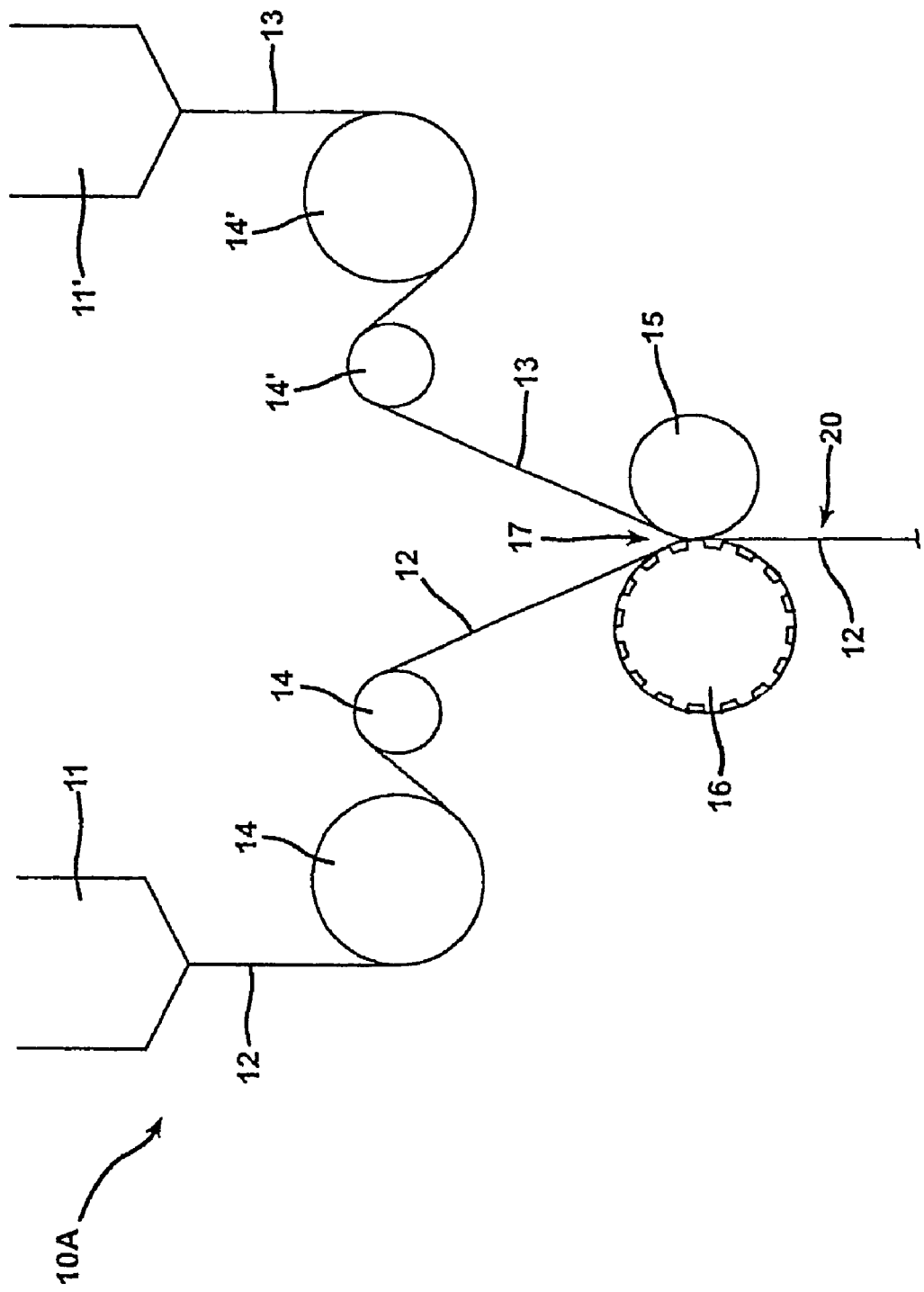

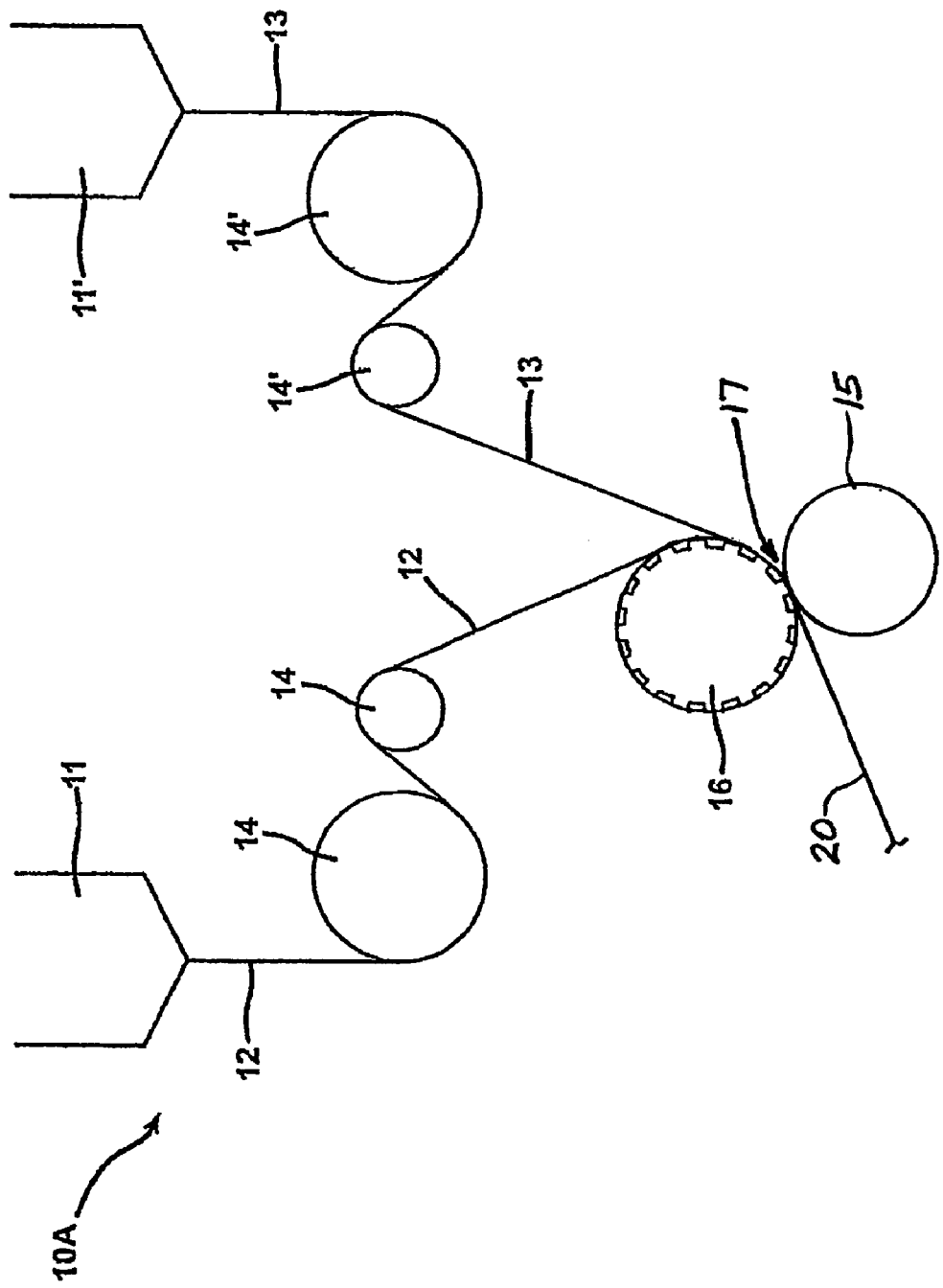

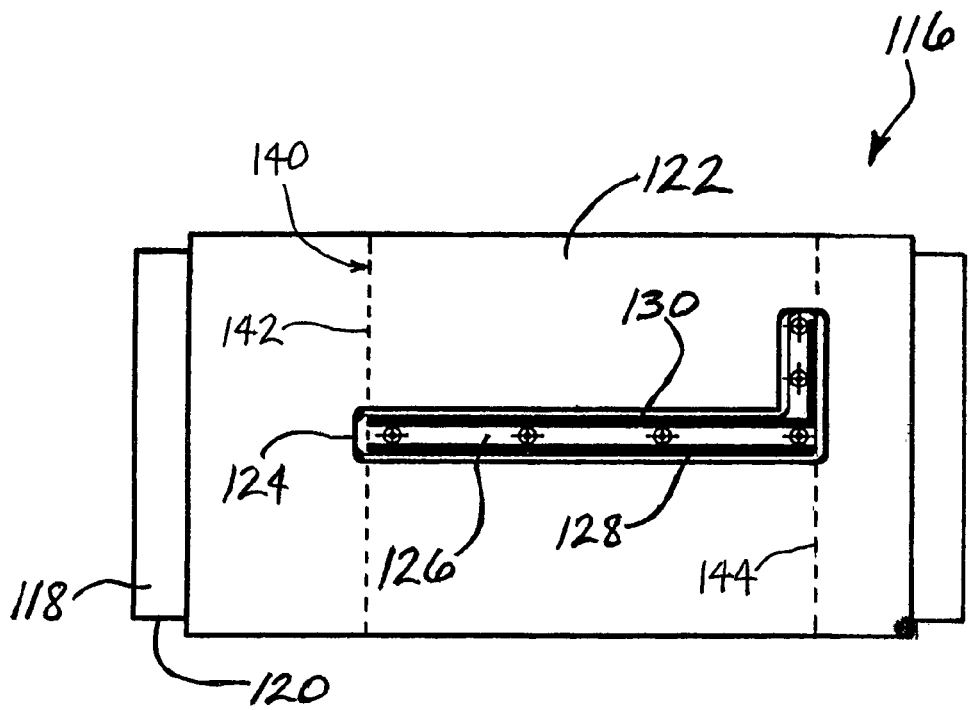
FIG. 14
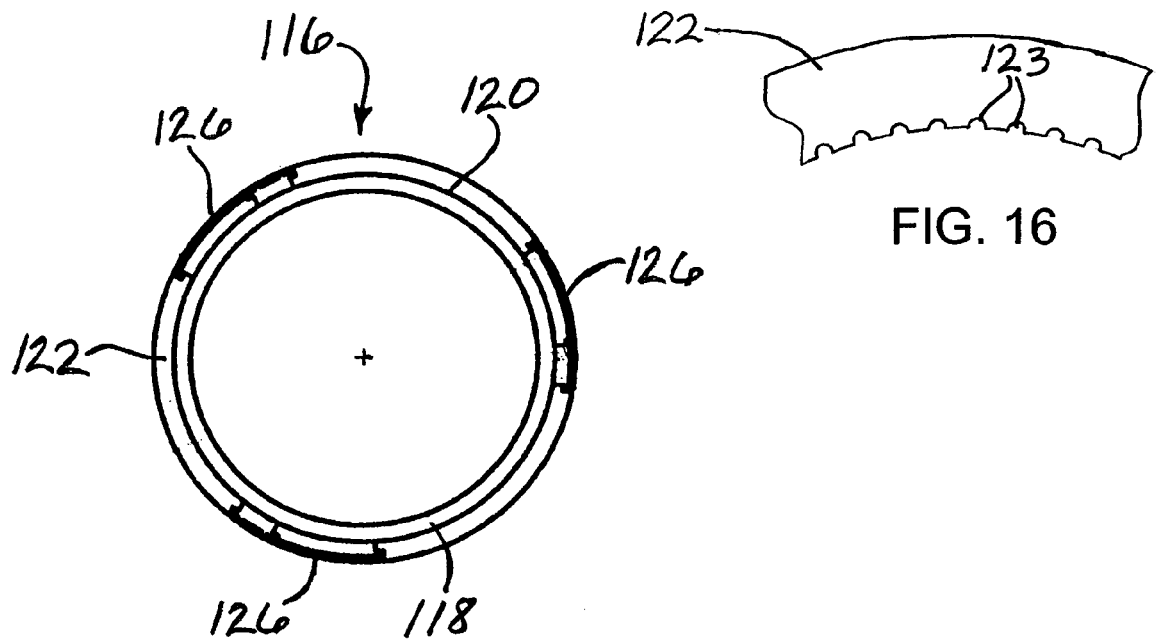
FIG. 15
FIG. 16

PROCESS AND APPARATUS FOR MAKING HEAT-SEALED ARTICLES

FIELD OF THE INVENTION

The present invention relates generally to methods of making heat-sealed film articles, apparatus for making heat-sealed film articles, and in some embodiments, to apparatus and methods for making heat-sealed film articles having inflatable chambers and channels.

BACKGROUND OF THE INVENTION

Conventional cushion materials include thermoformed sealed articles such as Bubble Wrap® cushioning material. It is also known to prepare heat-sealed inflatable articles that can be shipped to a packer in an uninflated condition and can be inflated immediately before use. Such inflatable articles are typically made from two heat-sealable films that are fused together in discrete areas to form one or more inflatable chambers.

SUMMARY OF THE INVENTION

In making some products, such as a lay-flat inflatable article made by sealing two flat flexible films together in a pattern which produces an inflatable article, it is desirable in some cases to heat seal the flexible films to one another at selected areas that are spaced apart by substantial distances. This can be accomplished by passing at least one of the films in a partial wrap around a heated sealing roller having raised surfaces for contacting and heat sealing the films together. Depending upon the degree of partial wrap and the particular sealing pattern of the raised surfaces, the films can "tent" (and even "drape") into the recessed areas between the raised surfaces, rather than remaining in a smooth cylindrical configuration over the surface of the sealing roller. The farther apart the raised surfaces are, the greater is the tendency for the films to tent into the recesses. Excessive tenting and/or draping is undesirable because it can result in film distortion and/or can result in film fusion in regions meant to remain unfused.

The present invention addresses the needs described above and achieves other advantages. The invention in a first aspect provides an apparatus for heat sealing together two polymer film portions (which can be two separately formed films or two portions of the same film) at selected areas to form a heat seal pattern while a remainder of the film(s) remain unsealed to each other, the apparatus comprising:

a rotatable, heated sealing roller having an outer surface; and a film guide system structured and arranged so that the film portions are brought into overlying contact with each other with one of the film portions contacting the outer surface of the sealing roller and such that at least said one of the film portions makes a partial wrap around the outer surface of the sealing roller;

the outer surface of the sealing roller comprising a first surface portion defining a configuration corresponding to the heat seal pattern and formed of a first material having a first thermal conductivity and a second surface portion formed of a second material having a second thermal conductivity lower, and preferably substantially lower, than the first thermal conductivity such that only areas of the film portions in contact with the first surface portion are heat sealed together while areas of the film portions contacted by the second surface portion remain unsealed to each other. The first and second surface portions can be, but do not necessarily have to be, substantially flush with each other at the outer surface. One or both film portions can partially wrap around the sealing roller; the film portion in contact with the roller can wrap around a greater fraction of the roller circumference than the other film portion; alternatively, both film portions can wrap around the roller to the same extent.

In one embodiment, the first material can be formed principally of metal. As one non-limiting example, the first material can comprise aluminum. However, other materials that are good thermal conductors can also be used for the first material, and combinations of two or more such materials can be used. The second material can be formed principally of a non-metallic material. The second material can comprise a polymer material. As one non-limiting example, the second material can comprise polytetrafluoroethylene. Alternatively, the second material can comprise ceramic. However, various other materials that are poor thermal conductors can also be used for the second material, and combinations or two or more such materials can be used.

The first material can have a thermal conductivity greater than about 50 W/m/° C., more preferably greater than about 100 W/m/° C., still more preferably greater than about 150 W/m/° C., and most preferably greater than about 200 W/m/° C. The second material can have a thermal conductivity less than about 10 W/m/° C., more preferably less than about 5 W/m/° C., and most preferably less than about 2 W/m/° C.

A coating or layer of release material can be applied to some or all of the cylindrical outer surface of the sealing roller. For example, the first surface portion of the roller can be coated with release material while the second surface portion is not; in this case the second surface portion can be formed of a material that itself has release properties, such as polytetrafluoroethylene. Alternatively, both the first and second surface portions can be coated with release material; this is particularly useful when the material forming the second surface portion does not itself have release properties (e.g., ceramic). Various release materials can be used, including polytetrafluoroethylene, silicone-based compositions, and the like.

In another aspect of the invention, a process for making a heat-sealed article comprises steps of bringing a first polymer film portion and a second polymer film portion into overlying contact with each other with the first film portion contacting the outer surface of a heated sealing roller of the configuration described above, and such that at least the first film portion makes a partial wrap around the outer surface of the sealing roller. The areas of the first film portion in contact with the first surface portion of the roller are heat sealed to the second film portion by raising at least the first film portion to a temperature at or above a fusion temperature, while areas of the first film portion in contact with the second surface portion remain unsealed to the second film portion. The second surface portion prevents "tenting" of the film portions in the unsealed regions. Of course, if one or more of the film portions are multilayer films having a sealing layer, the heating of such film need only be to a temperature at or above the fusion temperature of at least the seal layer of one or more of the film portions.

In yet another aspect, the present invention is directed to an integrated process for making an inflatable heat-sealed article, comprising the steps of: (A) extruding a first film and a second film; (B) cooling the first film and the second film so that the films will not fuse to one another upon contact with each other; (C) contacting the first film with the second film; (D) heating selected portions of at least one of the first and second flat films to a temperature above a fusion temperature, so that the first and second flat films are heat sealed to one another at a selected area, with the selected area providing a heat seal pattern which provides inflatable chambers between the first flat film and the second flat film, the heating being carried out by passing the first and second flat films together into contact with a heated sealing roller having a substantially cylindrical outer surface, the outer surface comprising a first surface portion defining a configuration corresponding to the heat seal pattern and formed of a first material having a first thermal conductivity and a second surface portion formed of a second material having a second thermal conductivity lower than the first thermal conductivity such that only areas of the films in contact with the first surface portion are heat sealed together, the first and second surface portions being substantially flush with each other at the outer surface; and (E) winding up or transporting the first and second flat films after they are heat sealed to one another, with the inflatable chambers uninflated.

While it is preferred to have the C and D steps in the above-listed order, they may be reversed in order, i.e., by first heating selected portions of at least one of the films followed by contacting the first film with the second film so that the first and second films are heat sealed to one another at selected areas. Moreover, the selected areas need not correspond exactly with the selected portions that are heated. That is, the portions that are heat sealed may be slightly larger or slightly smaller than the selected portions that are heated.

While the cooling of the extruded films can be active (e.g., contacting one or more films with one or more chilled rolls, belts, the use of cool air or water, etc.), it can also be passive, e.g., simply providing the first and second films enough time to cool under ambient conditions so that they do not fuse to one another upon contact. Thereafter, in order to heat seal the films to one another, it is necessary to heat at least the seal layers of one or both of the films to a temperature at or above a temperature at which the one or more of the seal layers will fuse.

Preferably, the first and second films are extruded simultaneously through separate dies, with the extrusion through the first die being used to produce the first film and the extrusion through the second die being used to produce the second film. Although it is possible to extrude both films from the same extruder and through a single die (followed by slicing the extrudate to separate the first film from the second film), preferably the first and second films are extruded using separate extruders and separate dies. Either or both the first and second films can be extruded using an annular die or a slot die, i.e., as an annular film or as a flat film, respectively. If an annular die is used, the resulting lay-flat tubing can either be self-welded into a flat film, or converted to one or more flat films by being slit in the machine direction.

Preferably, the contacting of the first film with the second film is carried out by forwarding the first film and second film together at the same speed. Although heating of selected portions of one or more of the films can be carried out before the films contact one another, preferably the heating of the selected portions of the first and second films is carried out while the first and second films are in contact with one another, with the heat sealing being carried out using a combination of heat and pressure. In one embodiment, the contacting step and the heating step are performed simultaneously, with pressure being simultaneous with the heating, resulting in contacting and heat sealing being essentially simultaneous. During sealing, preferably heat and pressure are applied simultaneously.

In one embodiment, heating is performed by passing the first and second films together through a nip between the heated sealing roller and a second roller. The first and second films can be heat sealed to one another in a repeating pattern of sealed and unsealed areas.

In a further aspect, the present invention is directed to an integrated process for making an inflatable heat-sealed article, comprising the steps of: (A) extruding a tubular film having an outside surface and an inside surface; (B) cooling the tubular film to a temperature low enough that the inside surface of the tubular film is cool enough not to adhere to itself; (C) placing the tubular film into a lay-flat configuration having a first lay-flat side and a second lay-flat side, so that a first inside lay-flat surface of the first lay-flat side of the tubular film is in contact with a second inside lay-flat surface of the second lay-flat side of the tubular film; and, (D) heat sealing selected portions of the first lay-flat side of the tubular film to the second lay-flat side of the tubular film, the heat sealing being carried out to provide a pattern of sealed and unsealed areas with the unsealed areas providing inflatable chambers between the first lay-flat side of the tubular film and the second lay-flat side of the tubular film. Depending upon the pattern of the heat sealing, the resulting heat-sealed article may or may not have to be slit along one or both side edges (i.e., slit in the machine direction) in order to provide access for means for inflating the inflatable chambers. This aspect of the present invention is preferably otherwise carried out in accordance with preferred features set forth above in the first aspect of the present invention. Thus, the film makes a partial wrap around the heated sealing roller, which has a first portion of relatively high thermal conductivity for producing the heat seal pattern and a second portion of lower thermal conductivity for supporting the film while not heat-sealing the film.

As yet another aspect, the present invention is directed to an integrated process for making an inflatable heat-sealed article, comprising the steps of: (A) extruding a flat film having a first outer surface and a second outer surface; (B) cooling the film so that the first outer surface is cool enough not to adhere to itself upon being doubled back against itself; (C) folding the film to make a crease in a machine direction of the film, with a first leaf of the film being on a first side of the crease and a second leaf of the film being on a second side of the crease, the first leaf being flat against the second leaf so that the first outer surface is doubled back against itself; and (D) heat sealing selected portions of the first leaf to the second leaf, the heat sealing being carried out to provide a pattern of sealed and unsealed areas with the unsealed areas providing inflatable chambers between the first leaf and the second leaf. This aspect of the present invention is also preferably carried out in accordance with preferred features set forth above in the first aspect of the present invention. Thus, the film makes a partial wrap around the heated sealing roller, which has a first portion of relatively high thermal conductivity for producing the heat seal pattern and a second portion of lower thermal conductivity for supporting the film while not heat-sealing the film.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a flow chart illustrating aspects of one stage integrated methods of making heat-sealed materials;

FIG. 2 is a diagrammatic view of one embodiment of an exemplary manufacturing system for making heat-sealed articles;

FIG. 2A is a diagrammatic view of another embodiment of an exemplary manufacturing system for making heat-sealed articles;

FIG. 14 is a side elevation of a sealing roller in accordance with one embodiment of the invention;

FIG. 15 is an end elevation of the sealing roller of FIG. 14; and

FIG. 16 is a fragmentary end elevation of the insulating shell of the sealing roller of FIG. 14.

DETAILED DESCRIPTION OF THE INVENTION

Figure 3:
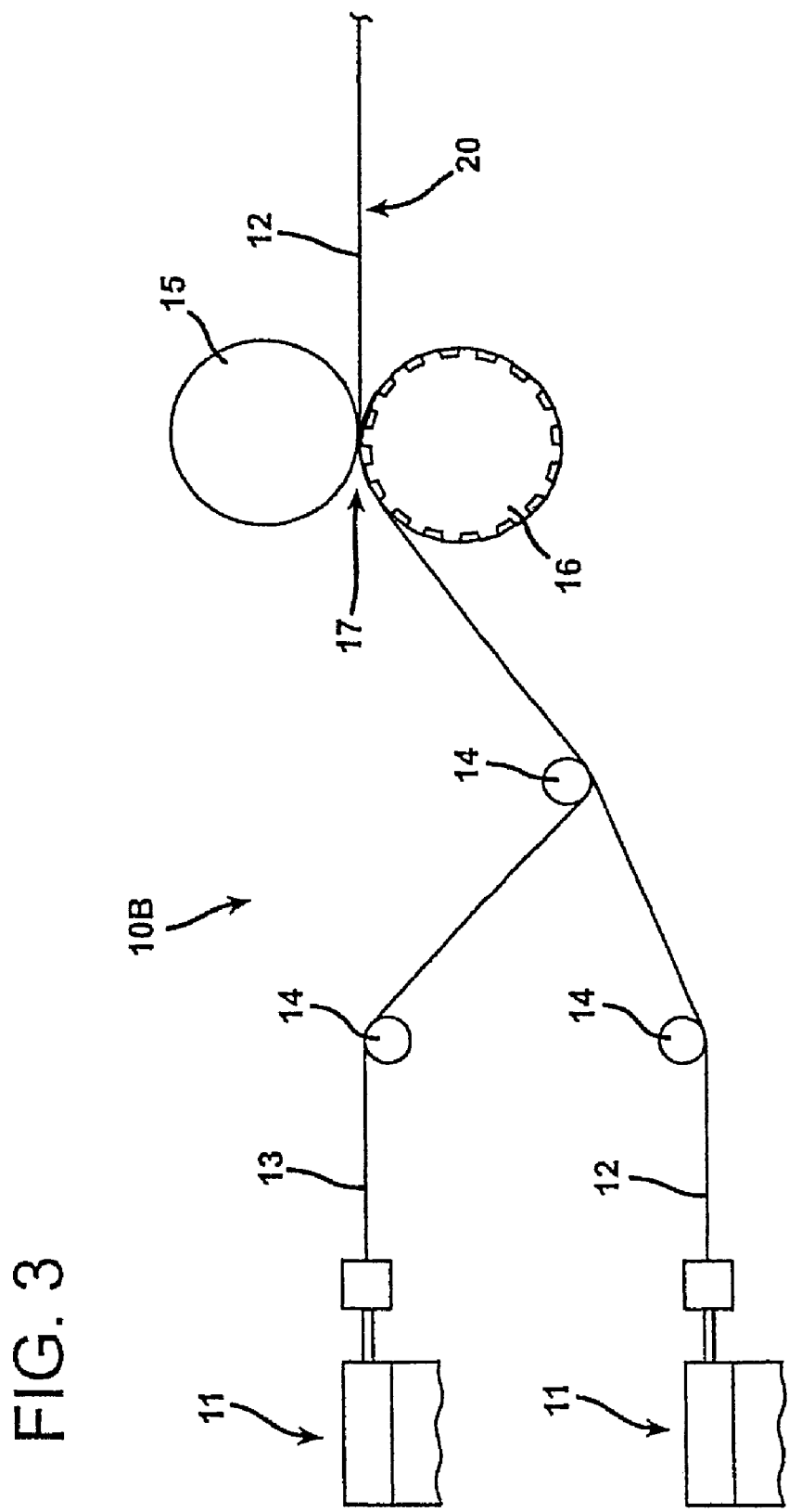
FIG. 3 is a diagrammatic view of another embodiment of an exemplary manufacturing system for making heat-sealed articles.

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods of making heat-sealed articles, the heat-sealed articles themselves, and apparatus for making the heat-sealed articles are disclosed. Heat-sealed articles are made from a single folded film, from two separate films, or from a tubular film. The heat-sealed articles are composed of films sealed to each other in selected seal regions, forming a pattern of sealed and unsealed portions. In particular embodiments, the unsealed portions can define chambers, inflation channels, connecting passageways, an inflation skirt, and optionally one or more inflation manifolds that can be inflated, thereby ultimately (i.e., upon inflation and sealing to entrap the inflation gas or fluid) providing cushioning pockets or bubbles within the heat-sealed article. The present invention is directed toward reducing distortion of the film that can occur when the film tents or drapes into recessed areas of a sealing roller surface defined between the actual sealing surfaces that seal the film.

U.S. Pat. No. 6,800,162, assigned to the same assignee as that of the present application, and hereby incorporated herein by reference, discloses an integrated, one-stage process for making an inflatable article. In the process and apparatus described in the '162 patent, two flat films are sealed together in selected areas by passing the films in a partial wrap around a heated sealing roller that has a raised surface. The process of the '162 patent is highly effective for streamlining the manufacture of a heat-sealed inflatable article. The sealing roller disclosed in the '162 has raised sealing surfaces between which recesses are defined. In the particular configuration disclosed in the '162 patent, however, the sealing surfaces are relatively close together such that the amount of draping of the film into the intervening recesses of the sealing roller would be unlikely to cause any significant distortion of the film. In other potential sealing roller configurations having sealing surfaces spaced farther apart, however, significant draping could occur and cause undesirable levels of film distortion. The present invention addresses this problem.

FIG. 1 is a flow chart illustrating various steps of a one-stage integrated method of making inflatable heat-sealed articles to which the present invention can be applied. Reference numerals 1 through 6 are employed to indicate the steps. The method of making the inflatable heat-sealed article includes a first step 1 comprising extruding two films. In a second step 2, the films are cooled to a temperature below the fusing temperature of each of the films. The third step 3 comprises contacting the first and second films to each other. The fourth step 4 comprises heating selected portions of the films. In a fifth step 5, the selected heated portions of the first film are sealed to the second film. A sixth step 6 comprises cooling the films to form the heat-sealed material.

Although cooling step 6 can be passive (e.g., in that the heat seals are simply allowed to cool by giving off heat to the ambient environment), it is preferably active in order to quickly cool the heat seals immediately after formation, so that the heat seal is not damaged or weakened by continued processing.

FIG. 2 is a diagrammatic view of one embodiment of an exemplary heat-sealed article manufacturing system 10a. Referring to FIG. 2 to illustrate methods of the present invention, the heat-sealed article manufacturing system 10a comprises extruders 11 and 11' that respectively extrude first and second films 12 and 13, transfer roller pairs 14 and 14', contact roller 15, and heated sealing roller 16. After exiting extruders 11 and 11', first and second films 12 and 13 are cooled to a temperature just below the fusing temperature of layers 12 and 13. Films 12 and 13 can be actively cooled by one or more of transfer rollers 14 or by exposure to ambient conditions. Transfer roller pairs 14 and 14' guide first and second films 12 and 13 to nip 17 formed between contact roller 15 and heated sealing roller 16. The film 12 is guided to make a partial wrap around the sealing roller 16, such that the film 12 is in contact with the outer surface of the roller for a longer circumferential distance than is the case with a conventional nip in which the films travel straight through the nip. The film 13 in this embodiment does not make a partial wrap about the roller 16. As films 12 and 13 pass through nip 17, pressure is applied to selected areas of both of films 12 and 13 while simultaneously heat is applied to the film 12 through the heated sealing roller 16, so that heated portions of films 12 and 13 are heat sealed to form heat seals in the sealed area, and inflatable chambers, passageways, etc in the unsealed area. As further described below in connection with FIG. 8, the heated sealing roll 16 has a configuration that substantially eliminates or at least greatly reduces the tendency of the films to drape into recesses and become distorted.

FIG. 2A illustrates an apparatus and process in accordance with another embodiment of the invention, generally similar to that of FIG. 2, except that both films 12, 13 make a partial wrap while together around the sealing roller 16 and the film 12 makes a greater or longer wrap around the roller than does the film 13.

In accordance with the present invention, the heat sealing can be between two monolayer films, between a multilayer film and a monolayer film, or between two multilayer films.

FIG. 3 is a diagrammatic view of another embodiment of an exemplary heat-sealed article manufacturing system 10*b*. First and second films 12 and 13 contact one another before first film 12 contacts heated sealing roller 16. Heated sealing roller 16 heats selected portions of first film 12 and simultaneously heats selected portions of second film 13 that correspond to the heated portions of first film 12.

Figure 4:
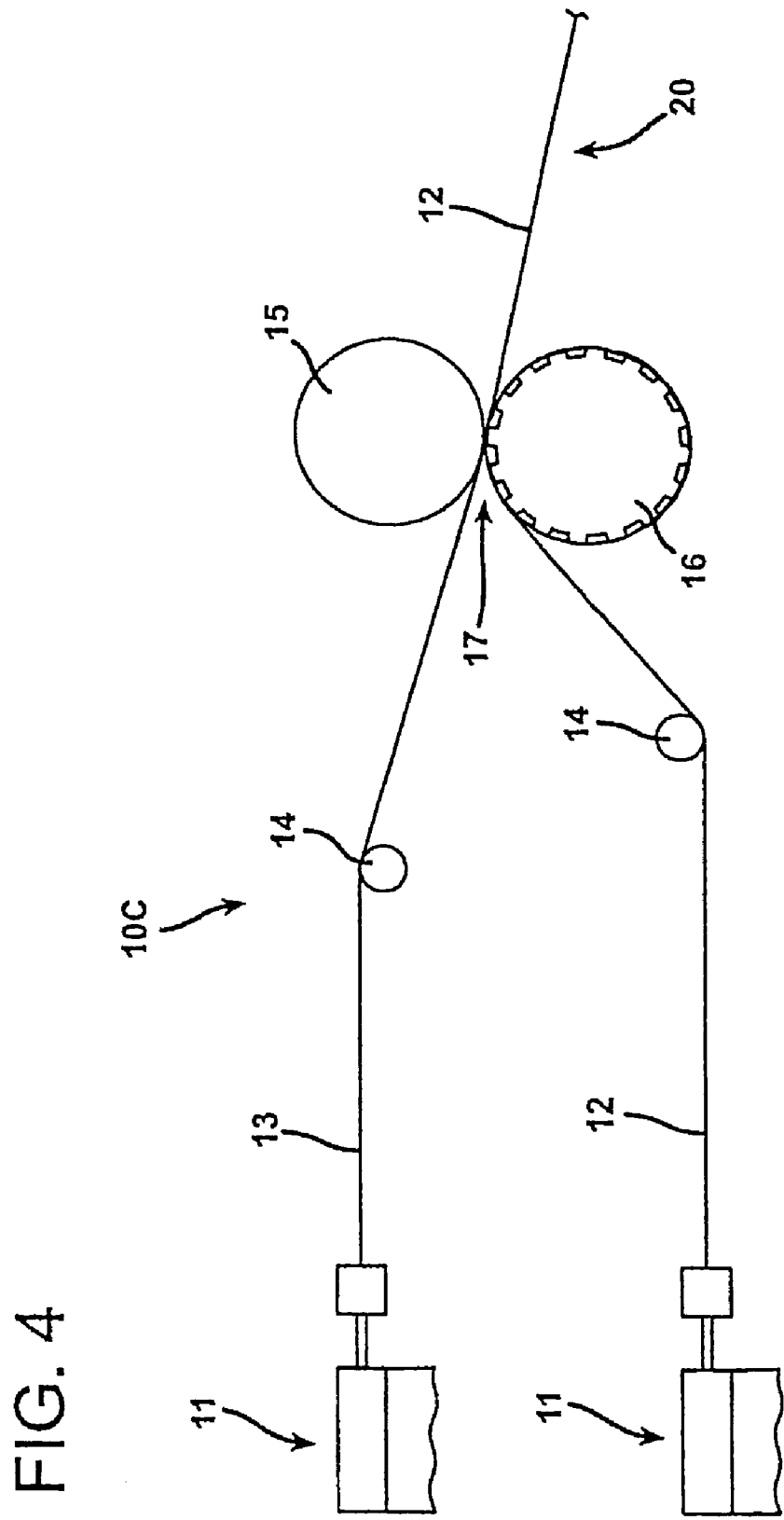
FIG. 4 is a diagrammatic view of another embodiment of an exemplary manufacturing system for making heat-sealed articles.

FIG. 4 is a diagrammatic view of an embodiment of alternative heat-sealed article manufacturing process 10*c*. In FIG. 4, first film 12 contacts heated sealing roller 16 before first film 12 contacts second film 13. Selected portions of first film 12 are heated by heated sealing roller 16 before first film 12 contacts second film 13, by advancing first film 12 partially around heated sealing roller 16 before passing films 12 and 13 through nip 17.

Figure 5:
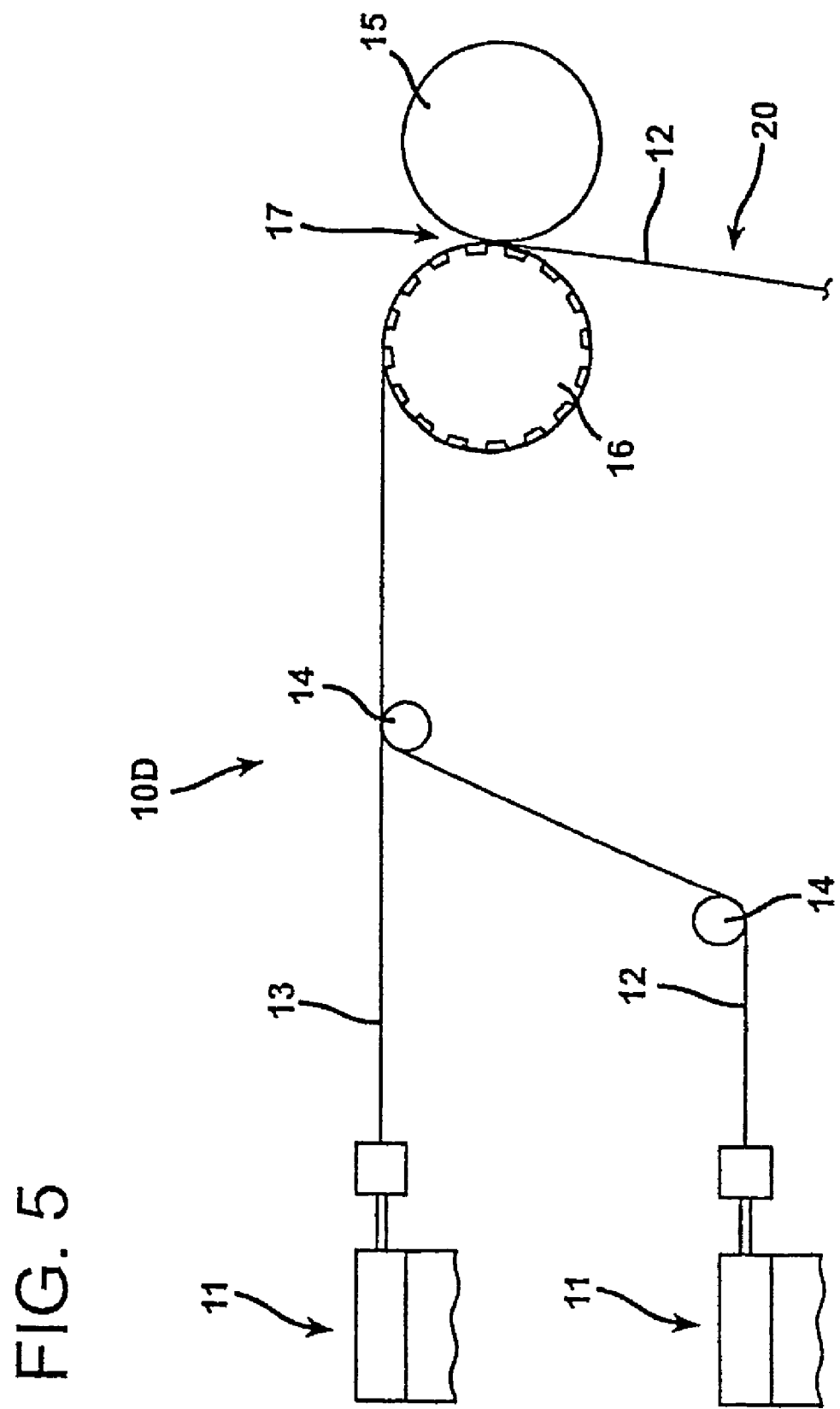
FIG. 5 is a diagrammatic view of another embodiment of an exemplary manufacturing system for making heat-sealed articles.

FIG. 5 is a diagrammatic view of another alternative process 10*d* for making an inflatable article. In FIG. 5, first and second films 12 and 13 are in mutual contact when first film 12 contacts heated sealing roller 16 before the films enter nip 17. First film 12 and second film 13 are heated by heated sealing roller 16 as they are advanced through nip 17 between heated sealing roller 16 and associated smooth nip roller 15.

Figure 6:
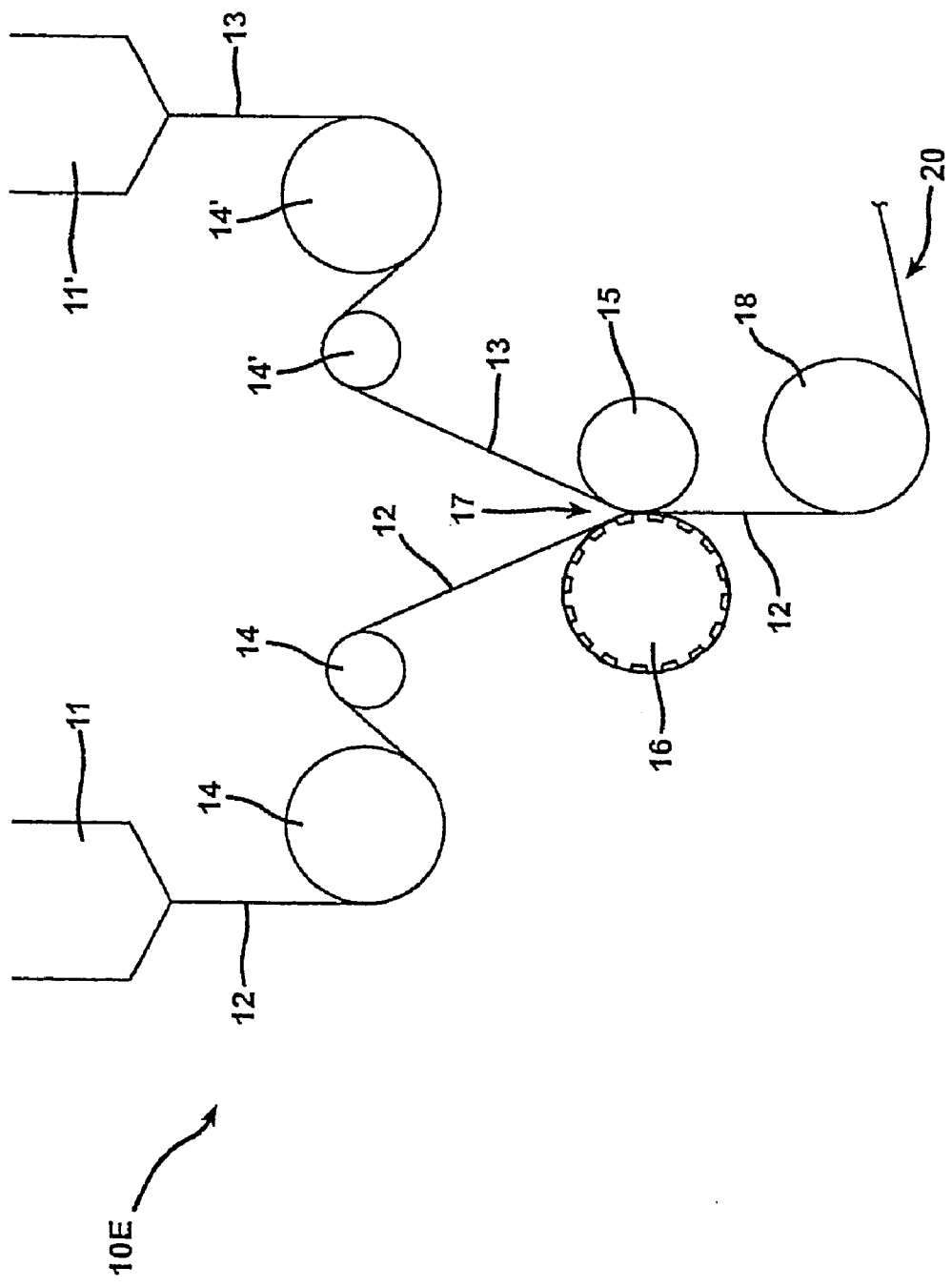
FIG. 6 is a diagrammatic view of another embodiment of an exemplary manufacturing system for making heat-sealed articles.

FIG. 6 is a diagrammatic view of another alternative process 10*e* for making an inflatable article. In FIG. 6, the process further utilizes cooling roller 18 to cool the heat sealed article 20 shortly after sealing. First and second films 12 and 13 pass between nip 17 where selected portions of films 12 and 13 are heat sealed. The heated portions of films 12 and 13 are cooled, by cooling roller 18, to a temperature below the fusing temperature of films 12 and 13. In another embodiment (not illustrated), cooling roller 18 forms a nip with heated sealing roller 16.

The one-stage process of making heat-sealed articles eliminates the need to wind-up component films 12 and 13 after extrusion but before lamination, as well as the need for transporting and unwinding such intermediate products. The integrated process involves controlling the temperature of the component films during fabrication, thereby providing films that are not stressed during fabrication as in conventional two-stage processes. Preferably, the films are maintained at a temperature close to the fusing temperature of films, to minimize the stresses placed on the films. Minimizing temperature fluctuations yields heat-sealed materials that are stronger and more durable than conventional packaging materials. The heat-sealed articles made by the present methods can be wound up uninflated, which permits shipping an intermediate product of relatively high density but which is ready for inflation at the location of the end-use, and this is more efficient than shipping a low-density inflated product.

The methods and apparatus described herein can be operated at a higher output than conventional processes, including for example film outputs of more than 250 feet in length of film per minute. In addition, the methods can produce larger width films than conventional processes, including for example, widths greater than 36 inches. The increase in film width and the increase in rate of film produced thereby permit an increase in the surface area of heat-sealed material produced more efficiently and at lower cost compared to conventional methods.

Figure 7:
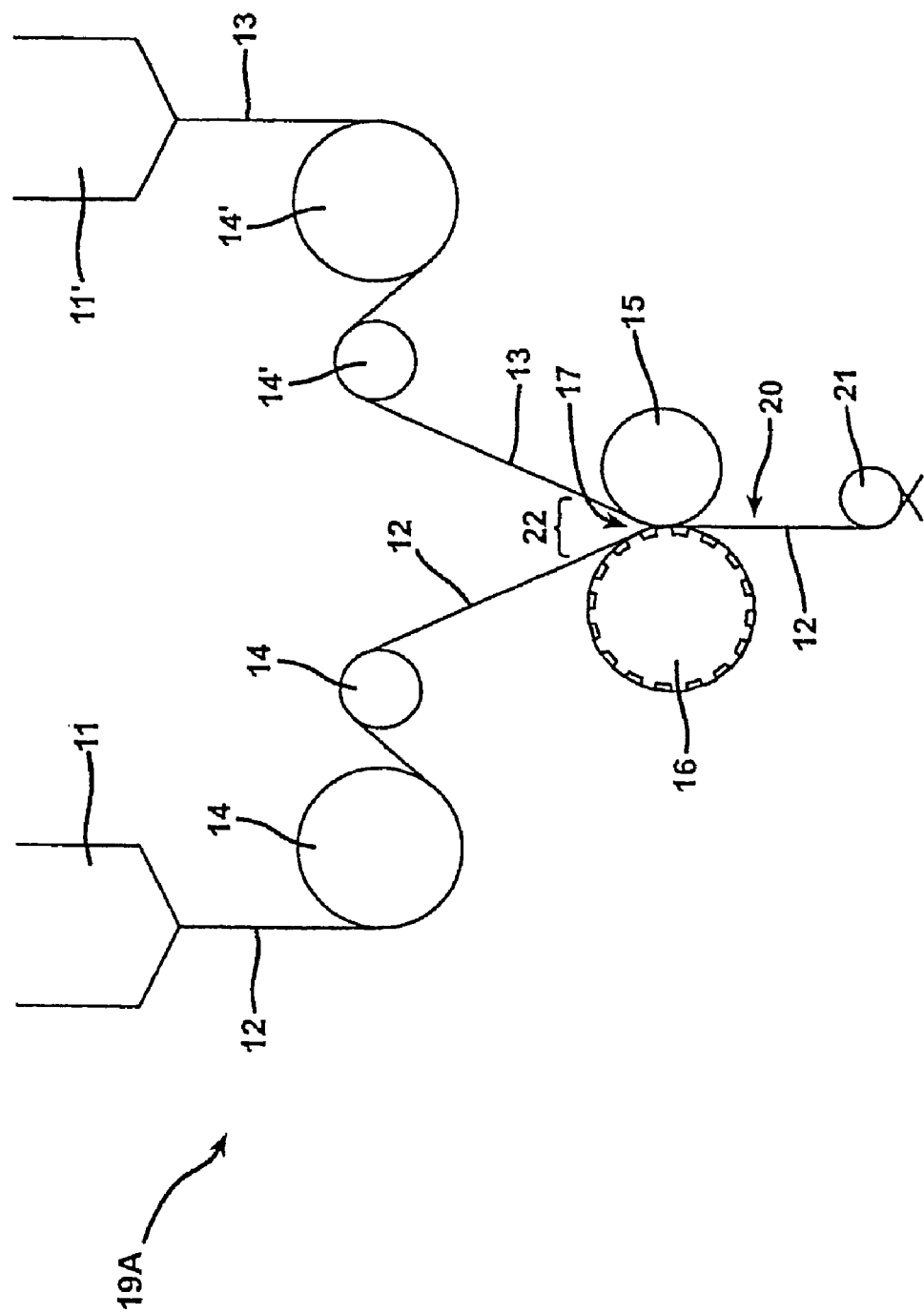
FIG. 7 is a diagrammatic view of an exemplary manufacturing apparatus for making heat-sealed articles.
Figure 8:
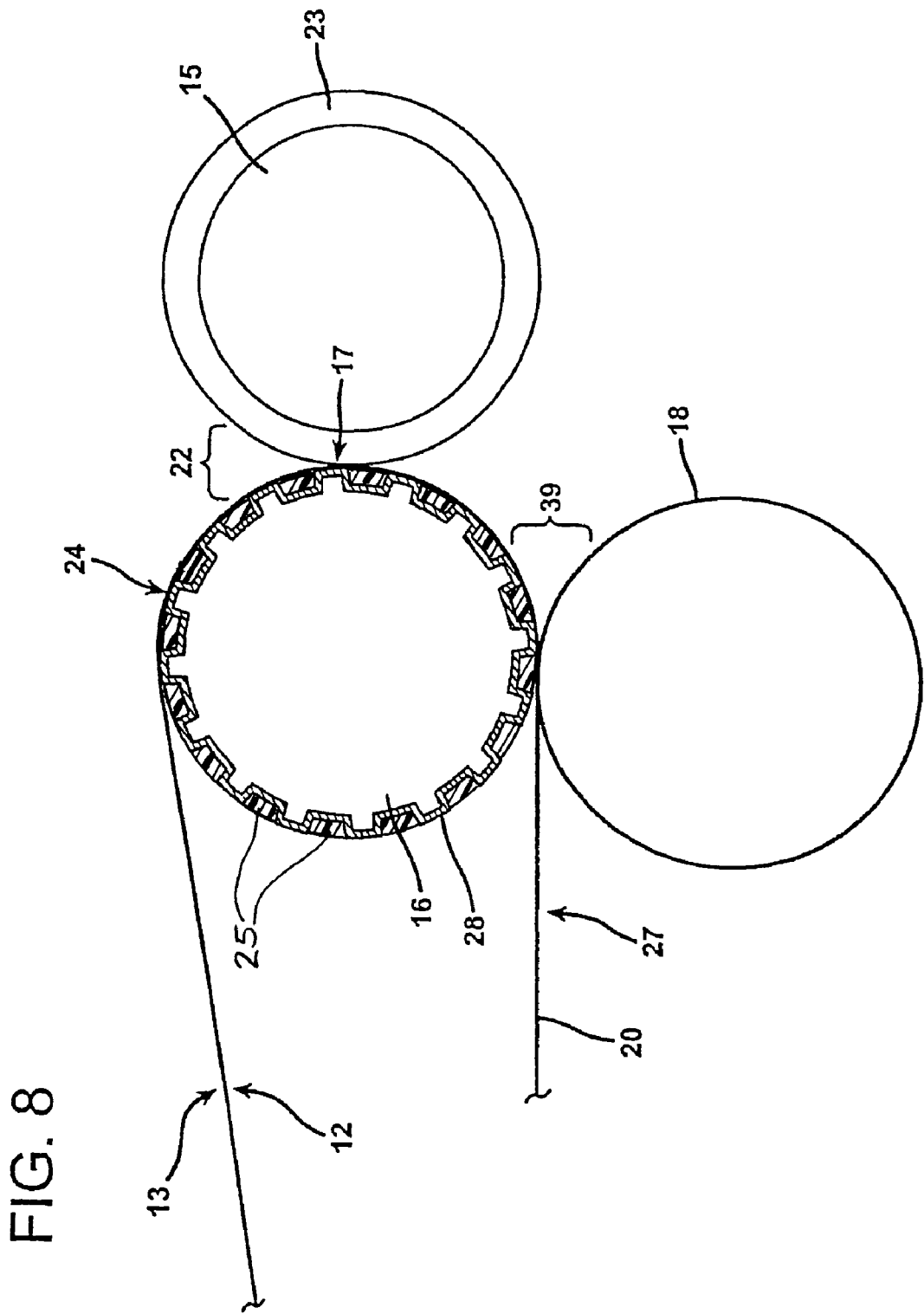
FIG. 8 is a diagrammatic view of a portion of the manufacturing process.

FIG. 7 is diagrammatic view of an alternative heat-sealed article manufacturing apparatus 19*a*. FIG. 8 is an diagrammatic view of an alternative arrangement nip 17. The methods described herein are performed by an apparatus capable of adjusting the temperature of films to maximize film fabrication speeds. Referring to FIG. 7 and FIG. 8, apparatus 19*a* for making heat-sealed material 20 comprises extruder 11, transfer roller pairs 14 and 14', contact roller 15, heated sealing roller 16, and collection roller 21. Contact roller 15 and heated sealing roller 16 are operatively associated to form nip 17 which defines sealing zone 22.

Figure 9:
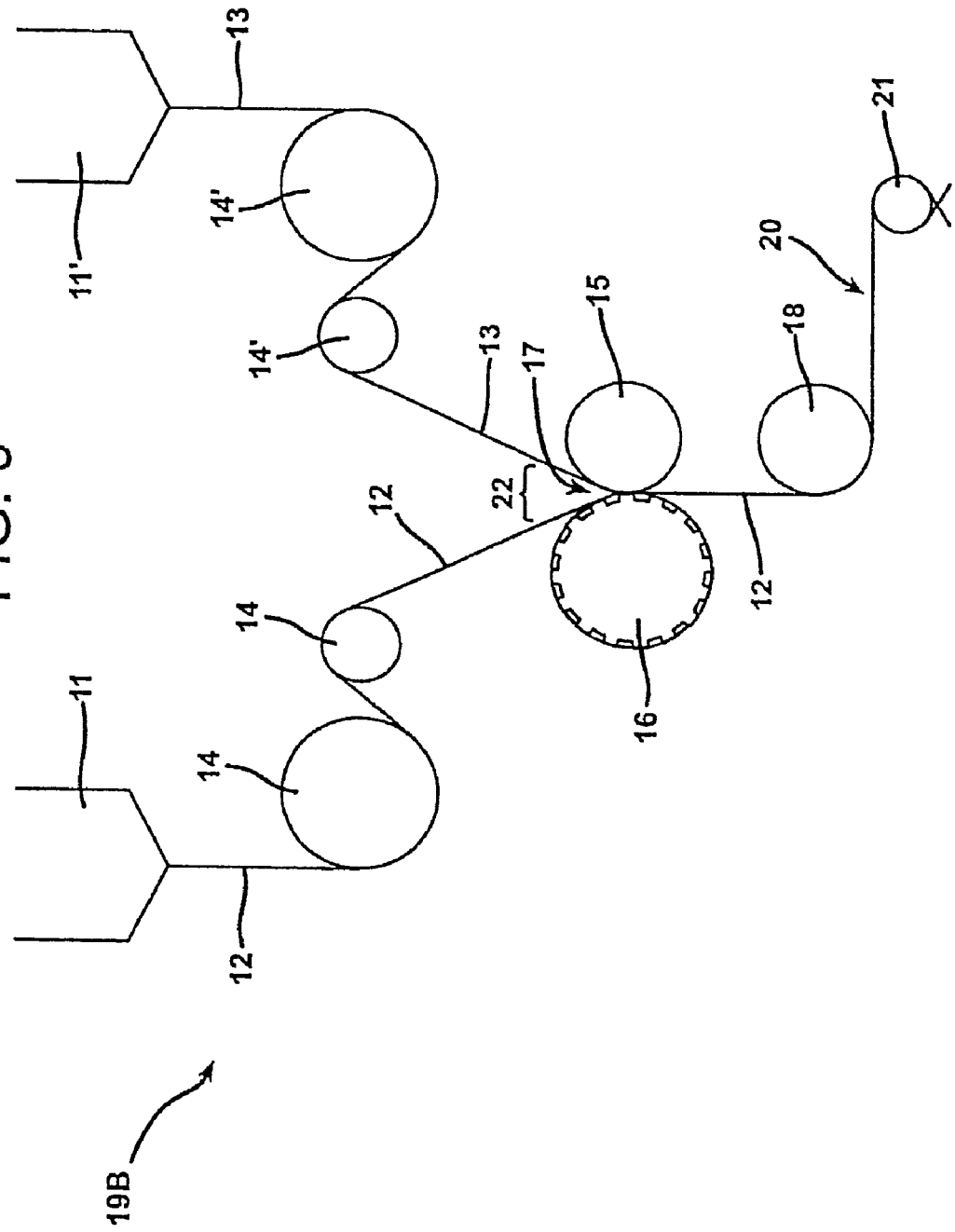
FIG. 9 is a diagrammatic view of another embodiment of a manufacturing apparatus for making heat-sealed articles.

FIG. 9 is a diagrammatic view of another embodiment of a heat-sealed article manufacturing apparatus 19*b*. Referring to FIG. 9, apparatus 19*b* comprises extruders 11 and 11', transfer roller pairs 14 and 14', contact roller 15, heated sealing roller 16, cooling roller 18, and collection roller 21.

Referring to FIG. 7, FIG. 8, and FIG. 9, transfer roller pairs 14 and 14' are conventional rollers familiar to persons skilled in the art of polymer film fabrication. With reference in particular to FIG. 7, the present invention is not limited to one transfer roller 14 or 14', but rather encompasses one or more rollers that guide films 12 and 13 to nip 17 as will be understood by persons familiar with film processing technology.

In one embodiment, films 12 and 13 are cooled by transfer roller pairs 14 and 14', the cooling being to a temperature below the fusing temperature of each of films 12 and 13. Transfer roller pairs 14 and 14' are heat transfer rolls, cooled by conventional methods, such as cold water circulated through the rolls. In embodiments of the present invention having more than one transfer roller, it is preferred that transfer roller pairs 14 and 14' immediately prior to nip 17 cool films 12 and 13 to a temperature below the fusing temperature of each of films 12 and 13.

Referring to FIG. 7, FIG. 8, and FIG. 9, contact roller 15 opposes heated sealing roller 16 and is operatively associated with heated sealing roller 16 to form nip 17. Contact roller 15 applies pressure to films 12 and 13 as the films pass through nip 17. The present invention is not limited to contact roller 15, but rather encompasses other contact surfaces formed on other apparatus, such as a planer surfaces, curved surfaces, or portion of a clamp, as will be understood by persons familiar with film processing technology in view of the present disclosure.

With reference in particular to FIG. 8, contact roller 15 preferably has an elastic outer layer 23. More preferably, the elastic outer layer 23 is a smooth rubber layer. The elastic outer layer 23 is deformable and readily conducts heat. The rubber outer layer 23 provides heat transfer to the second layer 13 and diminishes the tendency of adherence of the second layer of film 13 to contact roller 15.

As noted, the invention eliminates or greatly reduces tenting or draping of film into recesses of a sealing roller and thereby greatly reduces distortion of the film being heat sealed. The manner in which these ends are attained is now described with reference in particular to FIG. 8, which depicts a heated sealing roller 16. Heated sealing roller 16 is a heat transfer roller and can be heated by conventional heating apparatus, as will be understood by persons familiar with plastic film and roller heating technology. Preferably heated sealing roller 16 is heated by hot oil circulated within the roll. The roller 16 has an outer surface that comprises first surface portions 24 and second surface portions 25. The first surface portions 24 are formed of a material that has a relatively high thermal conductivity; for instance, aluminum, iron, steel, copper, titanium, or other metals can be used, as can alloys of two or more metals. The material of the first surface portions has a thermal conductivity greater than about 50 W/m/° C., more preferably greater than about 100 W/m/° C., still more preferably greater than about 150 W/m/° C., and most preferably greater than about 200 W/m/° C.

The second surface portions 25 of sealing roller 16 are formed of a material that has a relatively low thermal conductivity; for example, non-metallic materials such as polymers, ceramic, cementitious materials, cellulosic materials, or the like can be used. Mixtures or blends of two or more different materials can be used. In terms of polymers, polytetrafluoroethylene is one example of a suitable polymer for the second surface portions. The term "polymer" includes a single polymer or a blend of two or more polymers or a polymeric composition that contains at least one polymer together with other components, such as pieces of metal, inorganic particles, etc. The material forming the second surface portions can have a thermal conductivity less than about 10 W/m/° C., more preferably less than about 5 W/m/° C., and most preferably less than about 2 W/m/° C.

When the roller 16 is heated, the first surface portions 24 become substantially hotter than the second surface portions 25 because the second surface portions are much poorer thermal conductors than the first surface portions. The heating of the roller 16 is carried out in such a manner that the first surface portions 24, which correspond to the areas of the films to be heat-sealed together, become sufficiently hot to fuse the films together, while the second surface portions 25 remain below the fusing temperature of the films such that areas of the film that are contacted by the second surface portions 25 are not fused together. The first and second surface portions 24, 25 can be substantially flush with each other at the outer surface, collectively forming a substantially cylindrical outer surface of the roll. Alternatively, the first surface portions 24 can extend to a slightly greater radius than the second surface portions, such that tenting or draping of the film is kept to level that does not lead to any significant distortion of the film.

Figure 13:
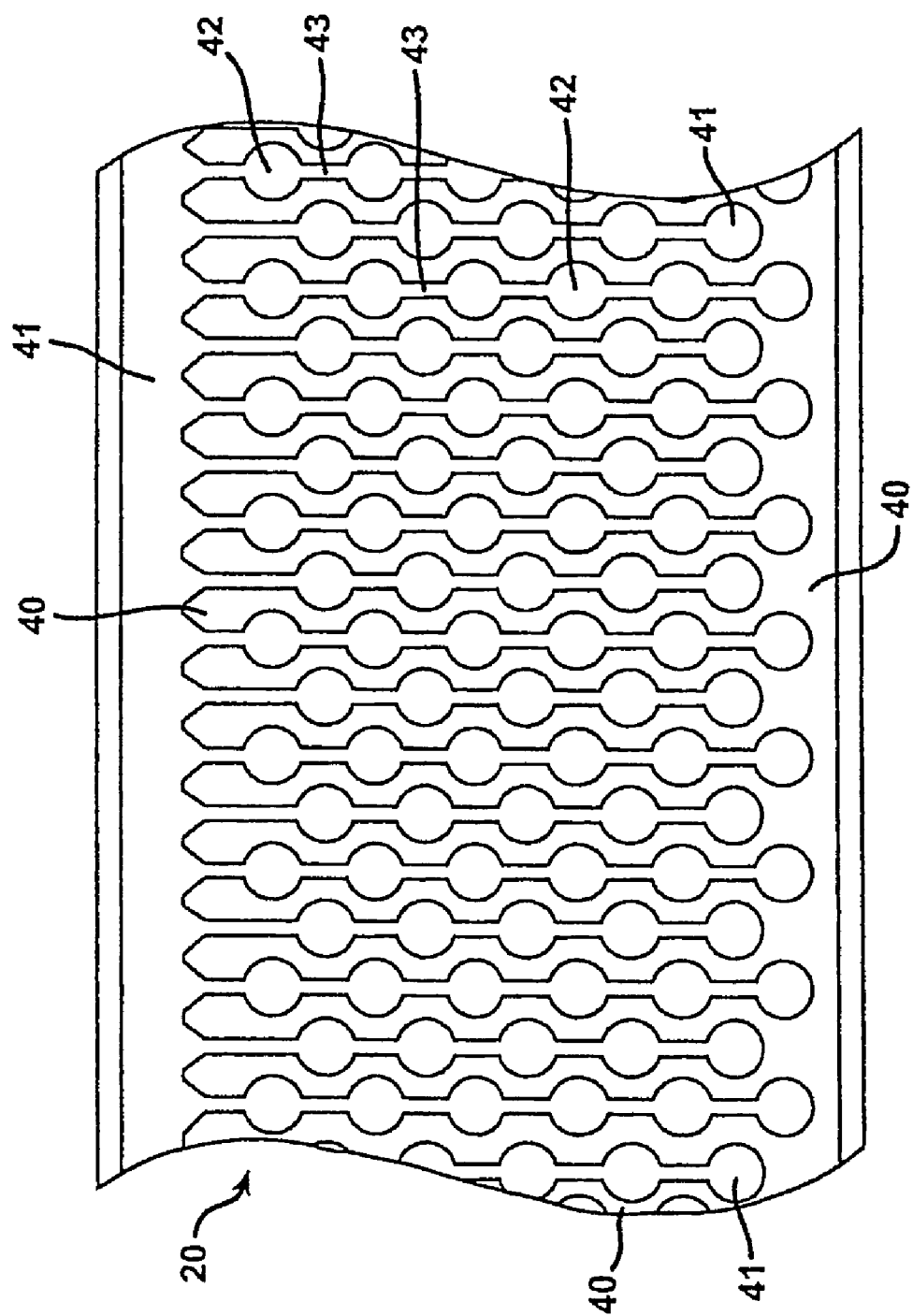
FIG. 13 is a diagrammatic view of a section of an inflatable article in accordance with an embodiment of the invention.

First surface portions 24 and second surface portions 25 form a patterned heat seal 27 in the material 20 as explained more fully below with reference to FIG. 13. First surface portions 24 are heated to above the fusing temperature of the films, thereby forming a pattern for the heat seal(s) to be made to form the inflatable article.

Various methods can be used for making the roller 16. As one non-limiting example, a metal roller can be first formed, having projecting surface portions that define the first surface portions for sealing the film. There are recesses defined between the projecting surface portions. These recesses can then be filled with a thermally insulating material such as polytetrafluoroethylene or other suitable material, such as by casting the material into the recesses. Other manufacturing methods can also be used, one example of which is discussed below in connection with FIGS. 14 and 15.

The methods of the present invention have an advantage over conventional methods of making protective heat-sealed articles and bubble film because the present methods do not require thermoforming of the structure of the film material during the heat sealing process by vacuum stretching the films. The outer surface of the roller 16 supports the films in a smooth configuration on the roller surface. More particularly, because the recesses that would otherwise be present between the first surface portions 24 are filled in by the material of the second surface portions 25, thereby preventing or reducing draping of the film into the recesses, the first surface portions 24 can be spaced relatively far apart without leading to distortion of the film, which may not be true when a raised surface roller is employed.

With reference in particular to FIG. 8, in one embodiment of the present invention, heated sealing roller 16 further comprises a release coating 28 on the first surface portions 24 for reducing adherence with film 12 while film 12 contacts heated sealing roller 16, and particularly when film 12 releases from roller 16. Various types of release coatings can be used. As one non-limiting example, release coating 28 can comprise a metal such as nickel-based alloy infused with one or more polymers; for instance, the coating can comprise a NEDOX coating available from General Magnaplate of Linden, N.J., or a similar type of polymer-infused metallic coating, which provides good wear-resistance while also substantially reducing the tendency of the coated surfaces to adhere to the film. The polymer that is infused can be any conventional polymer used for reducing adherence to polymer films, for example, Teflon® polytetrafluoroethylene. This is to be distinguished from the second surface portions 25, which in some embodiments can also be formed of polytetrafluoroethylene, in that the release coating 28 is very thin (and may also comprise metal) and hence does not provide any significant degree of thermal insulation. The release coating 28 on the first surface portions 24 of the heated sealing roller 16 can be infused by any conventional infusion process. Preferably, the surface of roller 16 is also textured to reduce adherence to polymer films, as discussed in more detail below.

Referring to FIG. 7 and FIG. 8, heated sealing roller 16 and contact roller 15 are operatively associated to form a nip 17. The term "nip" as used herein refers to an area between two rollers. First film 12 and second film 13 are in contact as they pass though nip 17. As first and second films 12 and 13 pass through nip 17, heat with or without pressure is applied to the films such that selected portions of first and second films 12 and 13 are fused together to form patterned heat seals 27 (see, for example, FIG. 12). Preferably, the films 12, 13 make a partial wrap about the sealing roller 16 as shown. The path of the films is controlled by suitable web guides such as rollers or the like (not shown in FIG. 8), such that the films partially wrap about the roller 16. Because of the cylindrical surface of the roller 16, the films are supported about the roller in a smooth, cylindrical configuration, as further described below.

In FIG. 9, extruders 11 and 11' are conventional extruders. First and second films 12 and 13 can be extruded as monolayer films, coextruded as multilayered films, extruded through an annular die or slot die, or extrusion coated which are familiar to persons familiar with plastic film manufacturing technology. In one embodiment, first and second films 12 and 13 are toughened by crosslinking via chemical crosslinking or irradiation techniques known to those of skill in the art.

In the embodiment as shown in FIGS. 2-7 and 9, extruder 11 can be one or more extruders.

Figure 10:
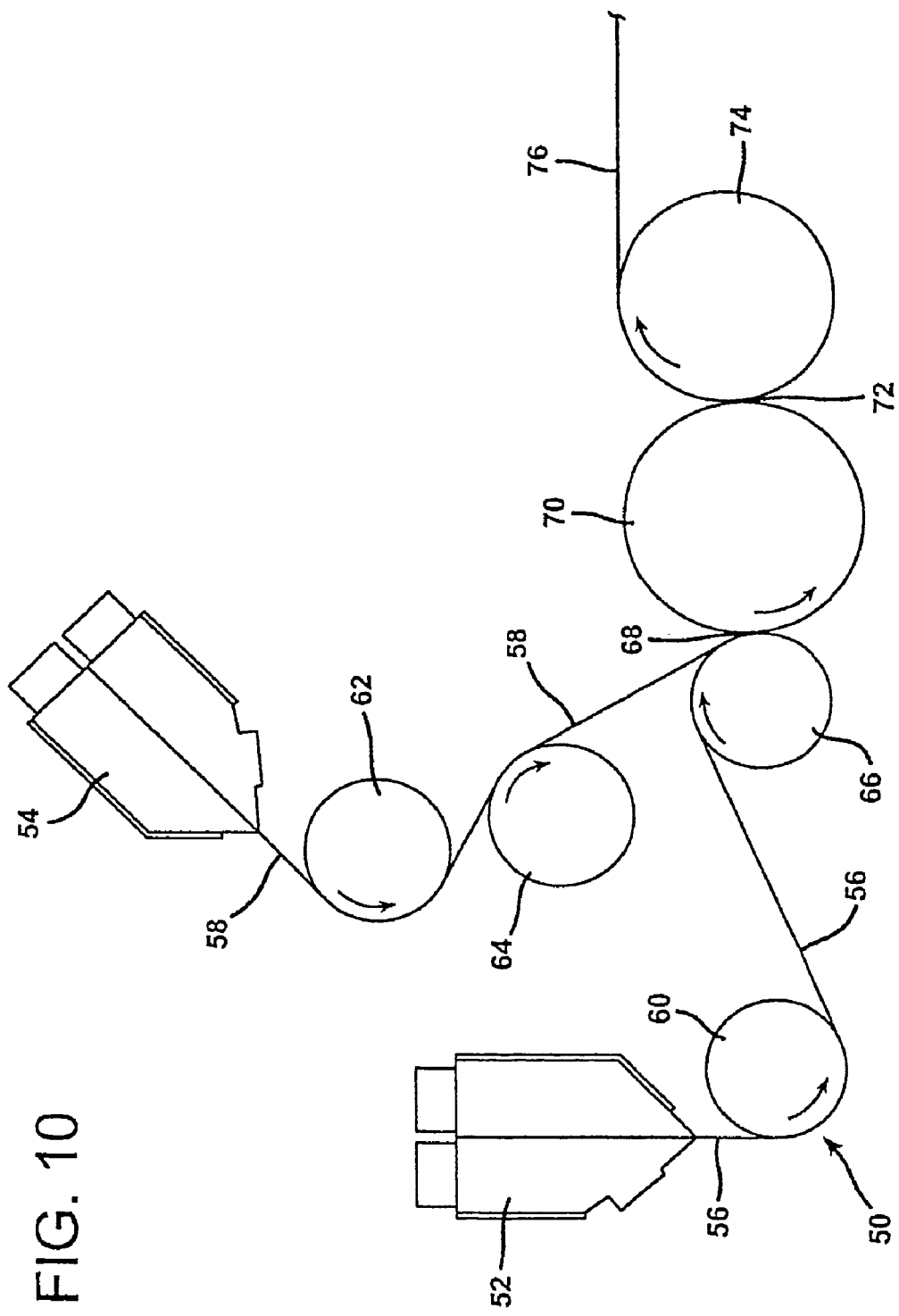
FIG. 10 is a diagrammatic view of a particularly preferred manufacturing process for making heat-sealed articles.

FIG. 10 is a schematic of a particularly preferred apparatus and process 50 for carrying out the present invention. In FIG. 10, extruders 52 and 54 extrude first film 56 and second film 58, respectively. After extrusion, film 54 makes a partial wrap around heat transfer (cooling) roller 60, which preferably has a diameter of 8 inches and which is maintained at a surface temperature well beneath the fusion temperature of the extrudate, e.g., from 100-150° F. Second film 58 makes partial wraps around each of heat transfer (cooling) rollers 62 and 64, each of which has a diameter of 8 inches and each of which is maintained at a surface temperature similar to that of cooling roller 60. After cooling, first film 56 makes a partial wrap (about 90 degrees) around Teflon® coated rubber nip roller 66, which has a diameter of 8 inches and which has, as its primary function, maintaining a nip 68 with heated sealing roller 70. While first film 56 is passing over nip roller 66, second film 58 merges with first film 56, with both films together being wrapped for a short distance around nip roller 66 before together entering first nip 68. The first film 56 in the illustrated embodiment has a greater degree of wrap around the nip roller 66 than does the second film 58. Nip roller 66 provides a location of films 56 and 58 to come together without being marred or distorted.

Thereafter, second film 58 makes direct contact with heated sealing roller 70. First nip 68 subjects films 56 and 58 to a pressure of from 2 to 10 pounds per linear inch, preferably 2 to 6 pounds per linear inch, more preferably about 4 pounds per linear inch. Films 56 and 58 together contact sealing roller 70 for a distance of about 180 degrees. Sealing roller 70 has a diameter of 12 inches, and is heated by circulating hot oil therethrough so that the first surface portions of its outer surface (not specifically shown in FIG. 10) are maintained at a temperature of from 280° F. to 350° F. Sealing roller 70 can have a Teflon® polytetrafluoroethylene coating on the first surface portion(s), if needed. Moreover, the thermally conductive first surface portions of the roller 70 can be provided with a surface roughness of from 50 to 500 root mean square (i.e., "rms"), preferably 100 to 300 rms, more preferably about 250 rms. This degree of roughness improves the release qualities of raised surface roller 70, enabling faster process speeds and a high quality product which is undamaged by licking back on roller 70.

The thermally conductive first surface portions heat the areas of film 58 that they contact. Heat is transferred from roller 70, through a heated portion of film 58, to heat a corresponding portion of film 56 to be heat sealed to film 58. Upon passing about 180 degrees around sealing roller 70, heated films 58 and 56 together pass through second nip 72, which subjects heated films 58 and 56 to about the same pressure as is exerted in first nip 68, resulting in a patterned heat seal between films 56 and 58.

After passing through second nip 72, films 58 and 56, now sealed together, pass about 90 degrees around heat transfer (cooling) roller 74, which has a diameter of 12 inches and which has cooling water passing therethrough, the cooling water having a temperature of from 100° F. to 150° F. Cooling roller 74 has a ¼ inch thick (about 0.64 cm thick) release and heat-transfer coating thereon. The coating is made from a composition designated "SA-B4", which is provided and applied to a metal roller by Silicone Products and Technologies Inc of Lancaster, N.Y. The coating contains silicone rubber to provide cooling roller 74 with a Shore A hardness of from 40 to 100, preferably 50-80, more preferably 50-70, and still more preferably about 60. The SA-B4 composition also contains one or more fillers to increase the heat conductivity to improve the ability of cooling roller 74 to cool the still hot films, now sealed together to result in inflatable article 76, which is thereafter rolled up to form a roll for shipment and subsequent inflation and sealing, to result in a cushioning article.

In order to carry out the process at relatively high speed, e.g., speeds of at least 120 feet per minute, preferably from 150 to 300 feet per minute, but up to as high as 500 feet per minute, it has been found to be important to provide the manufacturing apparatus with several features. In particular, the heated sealing roller should be provided with a release coating or layer on the first surface portions formed of the relatively high thermal conductivity material, and should avoid sharp edges which interfere with a clean release of the film from the roll. As used herein, the phrase "release coating" is inclusive of all release coatings and layers, including poly-infused coatings, applied coatings such as brushed and sprayed coatings which cure on the roll, and even a release tape adhered to the roll. A preferred release coating composition is Teflon® polytetrafluoroethylene. It is also important to provide the cooling roller downstream of and in nip relationship with the heated sealing roller, with a release coating or layer, as described above.

In view of the high speeds at which the apparatus and process of the invention can operate, the outside diameter of the heated sealing roller and the fraction of the roller circumference that is partially wrapped by the film portion(s) should be selected such that there is sufficient contact time between the sealing roller and the film portion or portions partially wrapped around the roller so that the heating of the film portion(s) is sufficient to heat seal them together. The sealing roller can have a diameter ranging from about 6 inches up to about 30 inches or more. The portion of the roller that contacts the film preferably has a substantially constant cross-section along its length, i.e., the film-contacting portion is not wavy or lumpy in the axial direction. The amount of partial wrap of the film portion(s) around the roller can range from about 10 degrees up to about 220 degrees, more preferably ranges from about 20 degrees up to about 180 degrees, and most preferably ranges from about 30 degrees up to about 180 degrees. A roller that is larger in diameter may be able to employ a smaller amount of wrap, while a roller that is smaller in diameter may require a large amount of wrap.

The process and apparatus illustrated in FIG. 10 can also be supplemented with additional optional components and steps. More particularly, one or both of films 58 and 56 can be preheated to a temperature below their fusing temperature, so that less heat need be added by heated sealing roller 70. In this manner, the process can be operated at higher speed, and/or the heat seal may be made stronger or of otherwise higher quality. Preheating can be carried out by, for example, providing nip roller 66 with heating characteristics in addition to providing heated sealing roller 70 with heating characteristics. Optionally, additional nips can be provided against heated sealing roller 70, to provide additional pressure points for the formation of strong heat seals at high manufacturing speeds.

Figure 11:
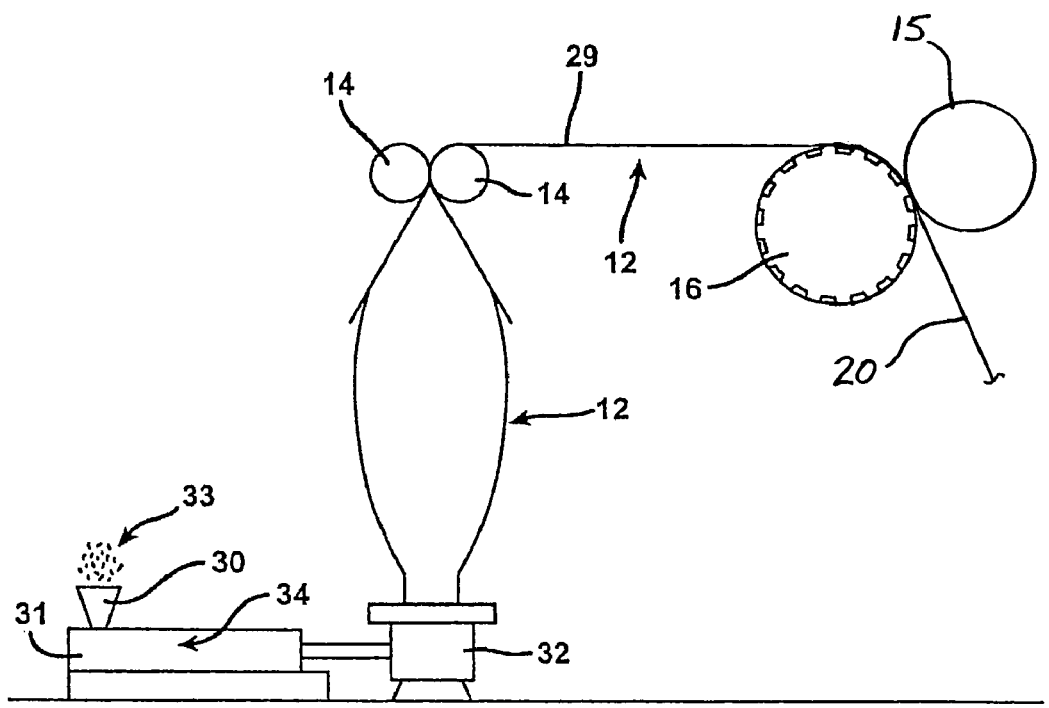
FIG. 11 is an exemplary film manufacturing apparatus using a tubular stock of film for making heat-sealed articles.

In another embodiment as shown in FIG. 11, a film is extruded in the form of a film tube, after which the tube is formed into a lay-flat configuration. The two lay-flat sides are used to form heat-sealed inflatable article 20. In such a process, only one extruder is needed, the extruder feeding a molten stream of polymer to an annular die from which the film tubing is extruded. Optionally, a second extruder can be used to extrusion coat the tubular film with one or more film layers by extrusion coating techniques known to those skilled in the film fabrication arts. FIG. 11 is a diagrammatic view of an exemplary film manufacturing apparatus using a tubular stock of film to fabricate heat-sealed material. Extruder 34 comprises resin hopper 30, body 31, and die 32. Extruder 34 can be any conventional extruder, including for example, single screw, double screw, and/or tandem extruders. In another embodiment, one or more extruders connected to die 32 co-extrude, as multilayer film or monolayer film, polymers having different properties or compositions.

Referring to FIG. 11 to illustrate methods of extruding films, films are fabricated by providing resin pellets 33 to resin hopper 30 of extruder 34, from which resin pellets 33 are fed into extruder 34. Resin pellets 33 are melted in extruder 34 to form a molten resin stream. Optional additives can be added to the molten resin stream in a separate stream injected into extruder 34 and/or added to the extruder on or with the addition of resin pellets 33 to hopper 30. Extruder 34 forces the molten resin stream through annular die 32 to form tubular film extrudate 12 which is oriented in the machine and transverse directions while the polymer is in the molten state (and while it cools). Orientation is generated by forcing the extrudate to enlarge to pass around a blown bubble of gas (providing orientation in the transverse direction), as well as orientation generated by operating nip rolls 14 at a higher speed than the speed of the molten extrudate emerging from the annular die (providing orientation in the machine direction). The tubular extrudate 12 is collapsed into lay-flat tubing 29 after it cools to a temperature at which it will not self-weld. This process is known as a "blown" film process.

Lay-flat tubing 29 can then be converted into the inflatable article 20 in the manner illustrated in FIG. 11 or as illustrated in FIG. 8. Alternatively, lay-flat tubing 29 could also be converted into the inflatable article using the arrangement illustrated in FIG. 10, with the lay-flat tubing 29 being the sole film being passed through the first and second nips 68 and 72, respectively, instead of using two separate films as illustrated in FIG. 10.

FIGS. 6, 8, illustrate embodiments of a system that further comprises a cooling roller 18. FIG. 10 illustrates corresponding cooling roller 74. These cooling rollers are to be maintained at a temperature below the fusing temperatures of films, using conventional cooling techniques. The cooling roller solidifies the heated portions of the first and second films. The present invention is not limited to one cooling roller 18, but rather further encompasses the use of two or more cooling rollers in the process, i.e., downstream of the heated sealing roller. Moreover, any suitable means for cooling could be used in place of one or more cooling rollers, such as cooled planer surfaces, cooled curved surfaces, cooled clamping surfaces of any shape, cool fluids and gases, etc., as will be understood by persons of skill in the art of film manufacture and processing.

The cooling roller lowers the temperature of the selected heated portions of the heat-sealed material, in order to cool the heat seals so that they become strong enough to undergo further processing without being damaged or weakened. Moreover, the cooling means is preferably immediately downstream of the heating means (i.e., the heated sealing roller), in order to reduce heat seepage from the still-hot seals to unheated portions of film, to prevent unheated portions of the article from becoming hot enough to fuse the films in an area intended to serve as an inflation chamber or inflation passageway.

Figure 12:
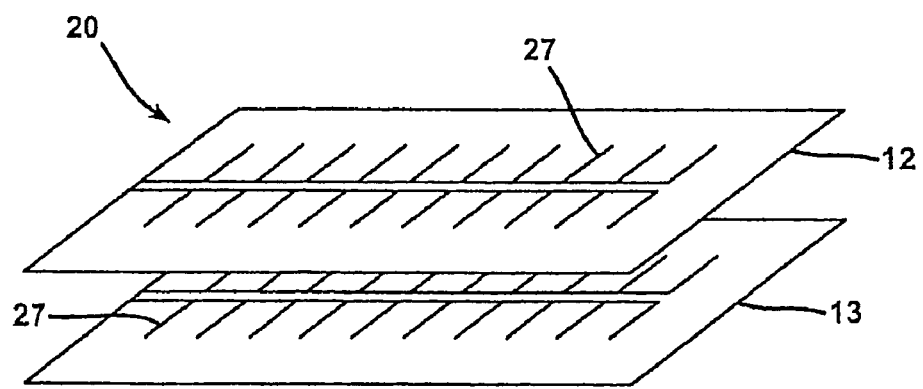
FIG. 12 is an exploded diagrammatic view of an exemplary heat-sealed material.

FIG. 12 is an exploded diagrammatic view of an exemplary heat-sealed material 20. FIG. 13 is a diagrammatic view of a section of a preferred heat-sealed inflatable article produced in accordance with the present invention. Referring to FIG. 12 and FIG. 13, heat-sealed material 20 comprises first film 12 heat sealed to second film 13 in a particular heat seal pattern. Heat-sealed material 20 has heat sealed portion 40, as well as unsealed portion 41. Heat sealed portion 40 is continuous along the machine direction of inflatable heat-sealed article 20, with sealed portion 40 corresponding to a preferred raised surface pattern for heated sealing roller 16 (FIG. 11) or 70 (FIG. 10). Unsealed portion 41 is also continuous along the machine direction of article 20, with unsealed portion 41 corresponding to a preferred recessed surface pattern (i.e., background pattern) of heated sealing roller 16 and 70. Unsealed portion 41 is arranged to form a pattern that includes distinct air chambers 42, connecting channels 43, as well as leaving a skirt (i.e., film flaps) for use in inflating the inflatable article. Optionally, the unsealed portion could further include a passageway in the machine direction which serves as a manifold, i.e. connecting each of the passageways along an edge of the article. However, a skirt is preferred.

The films referred to herein preferably comprise a polyolefin, such as for example a low density polyethylene, a homogeneous ethylene/alpha-olefin copolymer (preferably a metallocene-catalyzed ethylene/alpha-olefin copolymer), a medium density polyethylene, a high density polyethylene, a polyethylene terephthalate, polypropylene, nylon, polyvinylidene chloride (especially methyl acrylate and vinyl chloride copolymers of vinylidene chloride), polyvinyl alcohol, polyamide, or combinations thereof.

Preferably, heat-sealed materials 20 are as thin as possible, in order to minimize the amount of resin necessary to fabricate heat-sealed materials 20, but at the same time are thick enough to provide adequate durability. Preferably, first and second layers film 12 and 13 have a gauge thickness of from about 0.1 to about 20 mils. More preferably, each film layer has a total gauge thickness from about 0.5 to about 10 mils, more preferably from about 0.8 to about 4 mils, and even more preferably from about 1.0 to about 3 mils.

If desired or necessary, various additives are also included with the films. For example, additives comprise pigments, colorants, fillers, antioxidants, flame retardants, anti-bacterial agents, anti-static agents, stabilizers, fragrances, odor masking agents, anti-blocking agents, slip agents, and the like. Thus, the present invention encompasses employing suitable film constituents.

Preferably first and second films 12 and 13 are hot blown films having an A/B/C/B/A structure which has a total thickness of 1.5 mils. The A layers together make up 86 percent of the total thickness, each of the B layers making up 2% of the total thickness, and the C layer making up 10% of the total thickness. The C layer is an oxygen-barrier layer of 100% Caplon® B100WP polyamide 6 having a viscosity of Fav=100, obtained from Allied Chemical. Each of the B layers are tie layers made of 100% Plexar® PX165 anhydride modified ethylene copolymer from Quantum Chemical. Each of the A layers are a blend of 45% by weight HCX002 linear low density polyethylene having a density of 0.941 g/cc and a melt index of 4, obtained from Mobil, 45% by weight LF10218 low density polyethylene having a density of 0.918 g/cc and a melt index of 2, obtained from Nova, and 10% by weight SLX9103 metallocene-catalyzed ethylene/alpha-olefin copolymer, obtained from Exxon.

The heat-sealed articles formed according to the present invention will resist popping when pressure is applied to a localized area because channels of air between chambers provide a cushioning effect. The heat-sealed articles also show excellent creep resistance and cushioning properties due to inter-passage of air between bubbles.

As previously noted, the cylindrical outer surface of the sealing roller in accordance with the invention supports the film portions in a smooth cylindrical configuration as they partially wrap around the roll. This provides a major advantage in that the first surface portions that seal the film portions can be spaced as far apart as desired without having any effect on the distortion of the film portions. While the film distortion with a raised surface roller may not be significant when the first surface portions are spaced close together, it can become quite significant when they are spaced far apart. The sealing roller in accordance with the present invention obviates this difficulty.

As an example, FIGS. 14 through 16 depict a sealing roller 116 in accordance with an embodiment of the invention. The sealing roller 116 comprises a metal roller body 118 (which, for example, can be formed of aluminum or other suitable metal having good thermal conductivity) having a cylindrical outer surface 120. The roller body can comprise a hollow cylindrical structure, as shown, which can be mounted about a mandrel (not shown) through which heated oil is circulated for transferring heat to the roller body. A shell 122 of thermally insulating material, such as polytetrafluoroethylene or other (e.g., polymer-based or ceramic) material, is manufactured to have an inside diameter slightly greater than the outer diameter of the roller surface 120. The inner surface of the shell advantageously is formed (e.g., molded or machined) to have a plurality of grooves 123 (FIG. 16). The grooves can run in one or more directions along the inner surface (e.g., axial grooves only, radial grooves only, axial grooves and radial grooves, etc.). The shell is sleeved about the outer surface 120 of the roller body 118. The effect of the grooves 123 is to reduce the amount of surface area of the shell 122 that is in contact with the roller body 118 and thereby reduce the thermal conduction from the roller body to the shell. Stated differently, the grooves create air spaces between the roller body and the shell, which help insulate the shell from the roller body. One or more windows or cutouts 124 are formed through the thickness of the shell 122 having a configuration generally corresponding to the heat seal pattern desired to be formed in film material. For example, in the illustrated embodiment, L-shaped seals are to be made, and thus the cutouts 124 are generally L-shaped. Next, a seal bar 126 configured to fit into each cutout is inserted into each cutout and secured to the roller body 118 by any suitable technique such as threaded fasteners. As shown in FIG. 15, the inner edges of each cutout 124 in the shell advantageously can be stepped to have a radially outwardly facing step, and the outer periphery of each seal bar 126 can be similarly stepped to have a radially inwardly facing step that abuts the step of the shell. In this manner, when the seal bar is screwed down to or otherwise secured to the roller body, the shell is likewise secured to the roller body. Alternatively, the shell can be affixed to the roller body in other ways, such as by using threaded fasteners or the like.

Each seal bar 126 has one or more seal surfaces formed by a thermally conductive material such as aluminum or other metal. In the illustrated embodiment, each seal bar 126 has a seal surface 128 that is linear and parallel to the roller axis, and a second seal surface 130 that is L-shaped and has one linear portion parallel to the roller axis and spaced a small distance from the seal surface 128, and another portion that extends in the circumferential direction of the roller in a direction away from the seal surface 128. The seal surfaces 128, 130 can be substantially flush with the outer surface of the shell 122. Accordingly, the roller 116 has a substantially cylindrical outer surface formed collectively by the seal surfaces (i.e., first surface portions) and the shell (i.e., second surface portions). Therefore, even if the seal surfaces or first surface portions of the roller are spaced far apart in one or more directions along the roller surface, the film will still be supported in a smooth, substantially cylindrical configuration about the roller surface, thereby eliminating or substantially reducing distortion of the film. For instance, in the illustrated embodiment, there are only three seal bars 126 equally spaced about the circumference of the roller. Alternatively, there can be only two or even only one seal bar in accordance with the invention, and the film will still be supported in a smooth cylindrical configuration.

In other embodiments, the first surface portion(s) can be raised relative to the second surface portion(s). The amount by which the first surface portion(s) can be raised relative to the second surface portion(s) without leading to excessive distortion of the film depends on the particular configuration of the sealing roller, e.g., the roller diameter, the spacing between first surface portions, etc.

The sealing roller 116 of FIGS. 14-16 can be used for sealing together a center-folded web 140 (shown in dashed lines in FIG. 14) so as to create a series of interconnected bags or pouches that are closed along three sides and partially closed along the fourth side. More particularly, the center-folded web can be partially wrapped about the roller 116 in the position indicated in FIG. 14, wherein the fold 142 in the web is axially aligned with respect to the seal surfaces 128, 130 such that the seals made by the seal surfaces 128, 130 extend all the way to the fold; the seal surfaces can extend a short distance past the fold to ensure the seals are made all the way to the fold. At the opposite longitudinal edge 144 of the center-folded web, the two web portions are sealed together by the circumferentially extending portion of the L-shaped seal surface 130, but the seals made by this seal surface are intermittent and spaced along the length of the web. Accordingly, the center-folded web is sealed by the seal bars 126 such that each bag or pouch formed in the web has a closed bottom defined by the fold 142, two opposite sides sealed by the seal surface 128 and the axial portion of the seal surface 130, and a top that is partially closed by the seal formed by the circumferential portion of the seal surface 130. The bags can be wound into a roll and can subsequently be filled with air or other fluid and the tops can be sealed closed.

Alternatively, a seal roller formed in a manner similar to the roller 116 can operate upon a tubular film in a lay-flat configuration or upon two separate films in a manner similar to that described above. In the case of two separate films, the roller can be modified to include a continuous circumferential seal surface (positioned where the edge 142 is indicated in FIG. 14) for sealing closed the bottoms of the bags; in other respects, the roller can be the same as shown in FIG. 14. In the case of a tubular film, the roller 116 can be used as shown in FIG. 14. One fold of the lay-flat tube can be positioned as indicated by the edge 142 and the other fold can be positioned generally as indicated by the edge 144 in FIG. 14. The fold at edge 144 can be slit before the sealing is performed, in which case the web is essentially a center-folded web. Alternatively, the sealing can be formed first, and then the fold can be cut off in such a manner that the partial seal along the top of each bag is not removed or weakened.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A process for making an inflatable heat-sealed article, comprising the steps of:

(A) contacting a first film with a second film; and (B) heating selected portions of at least one of the first film and second film to a temperature at or above a fusion temperature, so that the first film is heat sealed to the second film at selected areas, the selected areas providing a heat seal pattern that provides inflatable chambers between the first film and the second film, the heating being carried out by bringing the first film and second film into overlying contact with each other with the first film contacting the outer surface of a heated sealing roller and such that at least the first film makes a partial wrap around the outer surface of the sealing roller, the outer surface comprising a first surface portion comprising a first material having a first thermal conductivity and a second surface portion formed of a second material having a second thermal conductivity lower than the first thermal conductivity, the first and second surface portions being substantially flush with each other at the outer surface and the first film contacting the first and second surface portions such that only areas of the first film in contact with the first surface portion are heat sealed to the second film while unsealed areas of the films remain where the first film contacts the second surface portion, the second surface portion preventing tenting of the films in the unsealed areas.

2. The process of claim 1, wherein the first and second films comprise separate films.

3. The process of claim 1, wherein the first and second films comprise two leaves of a single film folded along at least one fold line such that the two leaves are in contact with each other.

4. An integrated process for making an inflatable heat-sealed article, comprising the steps of:
(A) extruding a first flat film and a second flat film;
(B) cooling the first flat film and the second flat film so that the first and second flat films will not fuse to one another upon contact with each other;
(C) contacting the first flat film with the second flat film; and
(D) heating selected portions of at least one of the first and second flat films to a temperature above a fusion temperature, so that the first and second flat films are heat sealed to one another at a selected area, with the selected area providing a heat seal pattern that provides inflatable chambers between the first flat film and the second flat film, the heating being carried out by bringing the first and second flat films into overlying contact with each other with the first flat film contacting a substantially cylindrical outer surface of a heated sealing roller and with at least the first flat film partially wrapped around the outer surface, the outer surface comprising a first surface portion defining a configuration corresponding to the heat seal pattern and formed of a first material having a first thermal conductivity, and a second surface portion formed of a second material having a second thermal conductivity lower than the first thermal conductivity such that only areas of the films in contact with the first surface portion are heat sealed together, unsealed areas of the films remaining where the first flat film contacts the second surface portion, the first and second surface portions being substantially flush with each other at the outer surface, the second surface portion preventing tenting of the films in the unsealed areas.

5. The integrated process of claim 4, further comprising the step of:
(E) winding up or transporting the first and second flat films after they are heat sealed to one another, with the inflatable chambers uninflated.

6. The process according to claim 4, wherein the selected portions of at least one of the first and second flat films are heat sealed to one another using a combination of heat and pressure.

7. The process of claim 6, wherein the pressure is applied in a nip formed between the heated sealing roller and another roller.

8. The process according to claim 4, wherein the first and second flat films are extruded simultaneously.

9. The process according to claim 4, wherein the cooling step comprises contacting at least one of the first and second flat films with at least one cooling roller.

10. The process according to claim 4, wherein the first and second flat films are extruded by separate extruders.

11. The process according to claim 4, wherein the cylindrical outer surface of the heated sealing roller has a continuous first surface portion therearound.

12. The process according to claim 4, wherein the first and second flat films are heat sealed to one another in a repeating pattern of sealed and unsealed areas.

13. The process according to claim 4, wherein the heated sealing roller has a release coating thereon.

14. The process according to claim 4, further comprising cooling the first and second flat films after heating the selected portions of the flat films, the cooling being carried out by passing the first and second flat films together in a partial wrap around a cooling roller.

15. The process according to claim 4, wherein after cooling, the first flat film and the second flat film make a partial wrap around a roller that is upstream of the heated sealing roller.

16. The process according to claim 15, wherein the roller that is upstream of the heated sealing roller is in nip relation with the heated sealing roller.

17. The process according to claim 16, wherein the first flat film is between the second flat film and the heated sealing roller, and both the first flat film and the second flat film make a partial wrap around the roller in nip relation with the heated sealing roller, and the second flat film makes a longer partial wrap around the roller in nip relation than does the first flat film.

18. The process according to claim 4, wherein the first flat film is in direct contact with the cylindrical outer surface of the heated sealing roller, and the first flat film comprises at least one member selected from the group consisting of polyamide and polyethylene terephthalate.

19. The process according to claim 4, wherein the first flat film is in direct contact with the cylindrical outer surface of the heated sealing roller, and both flat films make a partial wrap around the cylindrical outer surface of the heated sealing roller.

20. The process of claim 19, wherein the first flat film makes a longer wrap around the cylindrical outer surface of the heated sealing roller than does the second flat film.

21. An integrated process for making an inflatable heat-sealed article, comprising the steps of:
(A) extruding a tubular film having an outside surface and an inside surface;
(B) cooling the tubular film to a temperature low enough that the inside surface of the tubular film is cool enough not to adhere to itself;
(C) placing the tubular film into a lay-flat configuration having a first lay-flat side and a second lay-flat side, so that a first inside lay-flat surface of the first lay-flat side of the tubular film is in contact with a second inside lay-flat surface of the second lay-flat side of the tubular film; and
(D) heat sealing selected portions of the first lay-flat side of the tubular film to the second lay-flat side of the tubular film, the heat sealing being carried out to provide a pattern of sealed and unsealed areas with the unsealed areas providing inflatable chambers between the first lay-flat side of the tubular film and the second lay-flat side of the tubular film, the heat sealing comprising contacting the tubular film with a heated sealing roller having a substantially cylindrical outer surface, the outer surface comprising a first surface portion defining a configuration corresponding to the heat seal pattern and formed of a first material having a first thermal conductivity and a second surface portion formed of a second material having a second thermal conductivity lower than the first thermal conductivity such that only areas of the first and second lay-flat sides of the tubular film in contact with the first surface portion are heat sealed together, unsealed areas of the lay-flat sides of the tubular film remaining where the lay-flat sides contact the second surface portion, the first and second surface portions being substantially flush with each other at the outer surface, the second surface portion preventing tenting of the lay-flat sides of the tubular film in the unsealed areas.

22. The process of claim 1, wherein the first surface portion of the outer surface of the sealing roller is formed principally of metal and the second surface portion of the outer surface of the sealing roller is formed principally of a non-metallic material.

23. The process of claim 22, wherein the non-metallic material comprises a polymer.

24. The process of claim 22, wherein the non-metallic material comprises polytetrafluoroethylene.

25. The process of claim 22, wherein the non-metallic material comprises ceramic.

26. The process of claim 1, wherein the sealing roller comprises a heated roller body defining the first surface portion of the outer surface and a shell of generally cylindrical configuration surrounding the roller body and defining the second surface portion of the outer surface, the shell defining an opening through which the first surface portion extends.

27. The process of claim 26, wherein the shell has a radially inner surface that abuts an outer surface of the roller body, the radially inner surface of the shell defining grooves for reducing the amount of surface area of the shell in contact with the roller body.

* * * * *